United States Patent
Jin et al.

(10) Patent No.: US 10,813,036 B2
(45) Date of Patent: Oct. 20, 2020

(54) ANCHOR GATEWAY SWITCHING METHOD, APPARATUS, AND SYSTEM

(71) Applicant: HUAWEI TECHNOLOGIES CO., LTD., Shenzhen, Guangdong (CN)

(72) Inventors: Aijin Jin, Shenzhen (CN); Han Zhou, Shanghai (CN); Jin Zhang, Shanghai (CN); Zhongping Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/254,207

(22) Filed: Jan. 22, 2019

(65) Prior Publication Data

US 2019/0159106 A1     May 23, 2019

Related U.S. Application Data

(63) Continuation of application No. PCT/CN2016/092421, filed on Jul. 29, 2016.

(51) Int. Cl.
*H04W 40/36* (2009.01)
*H04W 36/02* (2009.01)
(Continued)

(52) U.S. Cl.
CPC ......... *H04W 40/36* (2013.01); *H04W 36/023* (2013.01); *H04W 36/08* (2013.01);
(Continued)

(58) Field of Classification Search
CPC ....... H04L 1/1657; H04L 1/08; H04L 1/1819; H04L 29/06; H04L 43/0829;
(Continued)

(56) References Cited

U.S. PATENT DOCUMENTS

2007/0275726 A1\* 11/2007 Lee .......................... H04Q 7/20
2007/0293226 A1\* 12/2007 Lee .......................... H04Q 7/20
(Continued)

FOREIGN PATENT DOCUMENTS

| CN | 103857004 A | 6/2014 |
|---|---|---|
| CN | 104065764 A | 9/2014 |

(Continued)

*Primary Examiner* — Ronald B Abelson
(74) *Attorney, Agent, or Firm* — Womble Bond Dickinson (US) LLP

(57) ABSTRACT

Embodiments of the present disclosure provide an anchor gateway switching method, apparatus, and system. The method includes: determining, by a control plane (CP) device, to switch a source anchor gateway; obtaining, by the CP device, location information of a terminal; determining, by the CP device, a target anchor gateway based on the location information; and sending, by the CP device, a modification request message to an software defined network (SDN) controller, where the modification request message includes an identifier of the terminal and an identifier of the target anchor gateway, the modification request message is used to notify the SDN controller to: update, based on the identifier of the terminal and the identifier of the target anchor gateway, a forwarding flow table corresponding to a downlink packet, and send an updated forwarding flow table to an SDN switch.

16 Claims, 23 Drawing Sheets

(51) Int. Cl.
*H04W 36/12* (2009.01)
*H04W 40/24* (2009.01)
*H04W 36/08* (2009.01)
*H04W 36/38* (2009.01)
*H04W 64/00* (2009.01)
*H04W 36/32* (2009.01)

(52) U.S. Cl.
CPC ......... *H04W 36/12* (2013.01); *H04W 36/385* (2013.01); *H04W 40/24* (2013.01); *H04W 64/00* (2013.01); *H04W 36/32* (2013.01)

(58) Field of Classification Search
CPC .... H04L 43/0852; H04L 43/50; H04W 40/36; H04W 36/023; H04W 36/08; H04W 36/12; H04W 36/385; H04W 40/24; H04W 64/00
See application file for complete search history.

(56) References Cited

U.S. PATENT DOCUMENTS

| | | | |
|---|---|---|---|
| 2010/0054222 A1* | 3/2010 | Rune | H04W 36/00 |
| 2012/0294277 A1 | 11/2012 | Jaiswal et al. | |
| 2015/0103665 A1 | 4/2015 | Kaippallimalil et al. | |
| 2015/0271710 A1 | 9/2015 | Zhang et al. | |
| 2015/0319007 A1 | 11/2015 | Allan | |
| 2015/0334606 A1* | 11/2015 | Sun | H04W 36/00 |
| 2015/0365845 A1 | 12/2015 | Lonka et al. | |
| 2016/0100340 A1* | 4/2016 | Kim | H04W 36/00 |
| 2016/0134527 A1 | 5/2016 | Kwak et al. | |
| 2016/0150448 A1 | 5/2016 | Perras et al. | |
| 2016/0374095 A1 | 12/2016 | Jeon et al. | |
| 2018/0041931 A1* | 2/2018 | Shimojou | H04W 36/08 |

FOREIGN PATENT DOCUMENTS

| | | |
|---|---|---|
| CN | 104684044 A | 6/2015 |
| CN | 104869660 A | 8/2015 |
| CN | 105282803 A | 1/2016 |
| CN | 105357119 A | 2/2016 |
| CN | 105430116 A | 3/2016 |
| EP | 3076706 A1 | 10/2016 |
| WO | 2014209007 A1 | 12/2014 |
| WO | 2015/131926 A1 | 9/2015 |

* cited by examiner

ANCHOR GATEWAY SWITCHING METHOD, APPARATUS, AND SYSTEM

CROSS-REFERENCE TO RELATED APPLICATIONS

This application is a continuation of International Application No. PCT/CN2016/092421, filed on Jul. 29, 2016, the disclosure of which is hereby incorporated by reference in its entirety.

TECHNICAL FIELD

The present disclosure relates to the field of communications technologies, and in particular, to an anchor gateway switching method, apparatus, and system.

BACKGROUND

An evolved packet core (EPC) network is a new packet core network that further flattens a network. The EPC network mainly includes a mobility management entity (MME), a serving gateway (SGW), and a packet data network gateway (PDN Gateway, PGW). The SGW and the PGW sometimes serve as anchor gateways to provide a mobility anchor function for a terminal. In other words, the terminal accesses an APP service in a service server by using the anchor gateway.

In a conventional network, the anchor gateway is connected to the service server by using a conventional routing device, and the conventional routing device may send a downlink packet of the terminal to a source anchor gateway based on an existing routing table. If the source anchor gateway is switched to a target anchor gateway, because the conventional routing device cannot update the routing table in time, the conventional routing device may continue to send the downlink packet of the terminal to the source anchor gateway. As a result, data is lost, and the service of the terminal is interrupted. Therefore, even if a more proper target anchor gateway exists in a mobile process of the terminal, the source anchor gateway may not be switched to the target anchor gateway, and the downlink packet of the terminal is forwarded by using both the source anchor gateway and the target anchor gateway. For example, as shown in FIG. 1, when the terminal is moved from a source base station to a target base station, a transmission path of a downlink packet of the terminal is changed from a path indicated by a dashed-line arrow shown in FIG. 1 to a relatively roundabout path indicated by a solid-line arrow.

In this way, although continuity of the service can be ensured, the packet of the terminal may be transmitted in a roundabout path.

SUMMARY

Embodiments of the present disclosure provide an anchor gateway switching method, apparatus, and system, so that when an anchor gateway is switched, a packet loss rate of a packet is reduced in a transmission process, and the packet does not need to be transmitted in a roundabout forwarding path.

To achieve the foregoing objective, the following technical solutions are used in the embodiments of the present disclosure:

According to a first aspect, an embodiment of the present disclosure provides an anchor gateway switching method, including: determining, by a control plane (CP) device, to switch a source anchor gateway, where the source anchor gateway is an anchor gateway that forwards a downlink packet of a terminal for the terminal before the switching; obtaining, by the CP device, location information of the terminal; determining, by the CP device, a target anchor gateway based on the location information; and sending, by the CP device, a modification request message to a software-defined networking (SDN) controller, where the modification request message includes an identifier of the terminal and an identifier of the target anchor gateway, the modification request message is used to notify the SDN controller to: update, based on the identifier of the terminal and the identifier of the target anchor gateway, a forwarding flow table corresponding to the downlink packet, and send an updated forwarding flow table to an SDN switch, so that the SDN switch forwards the downlink packet to the target anchor gateway based on the updated forwarding flow table, and the target anchor gateway forwards the downlink packet for the terminal. Optionally, the CP device may further receive an answer message from the SDN controller, where the answer message is used to indicate that the source anchor gateway is successfully switched to the target anchor gateway.

In the anchor gateway switching method provided in this embodiment of the present disclosure, the CP device may determine the target anchor gateway based on the current location information of the terminal, and send the identifier of the terminal and the identifier of the target anchor gateway to the SDN controller, so that the SDN controller updates, based on the identifier of the terminal and the identifier of the target anchor gateway, the forwarding flow table corresponding to the downlink packet of the terminal. The SDN controller sends the updated forwarding flow table to the SDN switch, so that after receiving the downlink packet of the terminal, the SDN switch can directly send the downlink packet to the target anchor gateway based on the updated forwarding flow table, and the target anchor gateway forwards the downlink packet for the terminal. Therefore, the downlink packet of the terminal does not need to be forwarded by the source anchor gateway. This avoids transmitting the downlink packet in a roundabout forwarding path, and reduces a packet loss rate of the downlink packet in a transmission process.

According to a second aspect, an embodiment of the present disclosure provides an anchor gateway switching method, including:

receiving, by a software-defined networking (SDN) controller, a modification request message from a control plane CP device, where the modification request message includes an identifier of a terminal and an identifier of a target anchor gateway; updating, by the SDN controller based on the identifier of the terminal and the identifier of the target anchor gateway, a forwarding flow table corresponding to a downlink packet of the terminal; and sending, by the SDN controller, an updated forwarding flow table to an SDN switch, so that the SDN switch forwards the downlink packet to the target anchor gateway based on the updated forwarding flow table, and the target anchor gateway forwards the downlink packet for the terminal. Optionally, the SDN controller may further send an answer message to the CP device, where the answer message is used to indicate that a source anchor gateway is successfully switched to the target anchor gateway.

In the anchor gateway switching method provided in this embodiment of the present disclosure, the SDN controller can receive the identifier of the terminal that is from the CP device and the identifier of the target anchor gateway that is determined by the CP device based on the current location information of the terminal and that is from the CP device, to update the forwarding flow table corresponding to the downlink packet of the terminal. The SDN controller sends the updated forwarding flow table to the SDN switch, so that after receiving the downlink packet of the terminal, the SDN switch can directly send the downlink packet to the target anchor gateway based on the updated forwarding flow table, and the target anchor gateway forwards the downlink packet for the terminal. Therefore, the downlink packet of the terminal does not need to be forwarded by the source anchor gateway. This avoids transmitting the downlink packet in a roundabout forwarding path, and reduces a packet loss rate of the downlink packet in a transmission process.

According to a third aspect, an embodiment of the present disclosure provides an anchor gateway switching method, including: receiving, by an SDN switch, a forwarding flow table that is corresponding to a first end packet and that is from an SDN controller, where the first end packet is used to trigger a source anchor gateway to send a second end packet, and the forwarding flow table includes an end marker; generating, by the SDN switch after receiving a first downlink packet of a terminal, the first end packet based on the first downlink packet and the end marker, where the first downlink packet is a downlink packet from a service server to the terminal for the first time after the source anchor gateway is switched to a target anchor gateway; and forwarding, by the SDN switch, the first end packet to the source anchor gateway based on the forwarding flow table, to trigger the source anchor gateway to send the second end packet.

This embodiment of the present disclosure provides an end packet triggering method, and the first end packet from the SDN switch can be used to trigger the source anchor gateway to send the second end packet in the anchor gateway switching method provided in the present disclosure.

According to a fourth aspect, an embodiment of the present disclosure provides a CP device, including a processor, a memory, a system bus, and a communications interface.

The memory is configured to store a computer execution notification, the processor is connected to the memory by using the system bus, and when the CP device runs, the processor executes the computer execution notification stored in the memory, so that the CP device performs the anchor gateway switching method according to the first aspect or any optional manner of the first aspect.

According to an fifth aspect, an embodiment of the present disclosure provides a readable medium, including a computer execution notification, where when a processor of a CP device executes the computer execution notification, the CP device performs the anchor gateway switching method according to the first aspect or any implementation of the first aspect.

According to a sixth aspect, an embodiment of the present disclosure provides a software-defined networking SDN controller, including a processor, a memory, a system bus, and a communications interface.

The memory is configured to store a computer execution notification, the processor is connected to the memory by using the system bus, and when the SDN controller runs, the processor executes the computer execution notification stored in the memory, so that the SDN controller performs the anchor gateway switching method according to the second aspect or any optional manner of the second aspect.

According to a seventh aspect, an embodiment of the present disclosure provides a readable medium, including a computer execution notification, where when a processor of an SDN controller executes the computer execution notification, the SDN controller performs the anchor gateway switching method according to the second aspect or any implementation of the second aspect.

According to an eighth aspect, an embodiment of the present disclosure provides a software-defined networking SDN switch, including a processor, a memory, a system bus, and a communications interface.

The memory is configured to store a computer execution notification, the processor is connected to the memory by using the system bus, and when the SDN switch runs, the processor executes the computer execution notification stored in the memory, so that the SDN switch performs the anchor gateway switching method according to the third aspect.

According to a ninth aspect, an embodiment of the present disclosure provides a readable medium, including a computer execution notification, where when a processor of an SDN switch executes the computer execution notification, the SDN switch performs the anchor gateway switching method according to the third aspect.

According to a tenth aspect, an embodiment of the present disclosure provides an anchor gateway switching system, including: the CP device according to the fourth aspect or any optional manner of the fourth aspect, the SDN controller according to the fifth aspect or any optional manner of the fifth aspect, the SDN switch according to the sixth aspect, a source anchor gateway, and a target anchor gateway.

In the anchor gateway switching system provided in this embodiment of the present disclosure, the CP device may determine the target anchor gateway based on the current location information of the terminal, and send the identifier of the terminal and the identifier of the target anchor gateway to the SDN controller, so that the SDN controller updates, based on the identifier of the terminal and the identifier of the target anchor gateway, the forwarding flow table corresponding to the downlink packet of the terminal. The SDN controller sends the updated forwarding flow table to the SDN switch, so that after receiving the downlink packet of the terminal, the SDN switch can directly send the downlink packet to the target anchor gateway based on the updated forwarding flow table, and the target anchor gateway forwards the downlink packet for the terminal. Therefore, the downlink packet of the terminal does not need to be forwarded by the source anchor gateway. This avoids transmitting the downlink packet in a roundabout forwarding path, and reduces a packet loss rate of the downlink packet in a transmission process.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure.

DESCRIPTION OF EMBODIMENTS

The following describes the technical solutions in the embodiments of the present disclosure in detail with reference to the accompanying drawings in the embodiments of the present disclosure. Apparently, the described embodiments are merely some but not all of the embodiments of the present disclosure.

An anchor gateway switching method provided in the embodiments of the present disclosure may be applied to an EPC network architecture based on a software-defined networking (SDN) technology, and an anchor gateway is connected to a service server by using the SDN.

In the embodiments of the present disclosure, an EPC device is classified into a control plane (CP) device and a user plane (UP) gateway. As an anchor gateway, the user plane gateway is responsible for data packet forwarding, and the CP device is responsible for controlling the anchor gateway to complete data packet forwarding.

The CP device may be an MME in an EPC network, and the anchor gateway is an S-PGW in the EPC network.

Optionally, a gateway in the EPC device is classified into a gateway control plane (GW-C) and a gateway user plane (GW-U). Therefore, the CP device may include the GW-C, the MME, and a function module in the EPC device, and the anchor gateway is the GW-U. Sometimes the GW-U is also referred to as a distributed gateway (DGW), or is directly referred to as a UP.

Optionally, the EPC may perform function module division based on an actual requirement, to determine the CP device and the anchor gateway.

The network architecture based on the SDN technology is a directly programmable network architecture that separates control from forwarding. In the network architecture based on the SDN technology, both a specific forwarding path and a forwarding policy of each data packet in the network are controlled by an SDN controller. The SDN controller sends a forwarding flow table of the data packet to an SDN domain by using an OpenFlow protocol, and the SDN domain forwards the received data packet based on the corresponding forwarding flow table.

The SDN domain may include an SDN switch cluster, and an SDN switch in the network architecture based on the SDN technology is responsible for forwarding the data packet based on the forwarding flow table of the data packet.

Optionally, the SDN domain may be implemented on another underlying transport network overlaid with an SDN switching device. Data transmission between SDN switching devices is performed by using a transmission tunnel provided by the underlying transport network.

Figure 1:
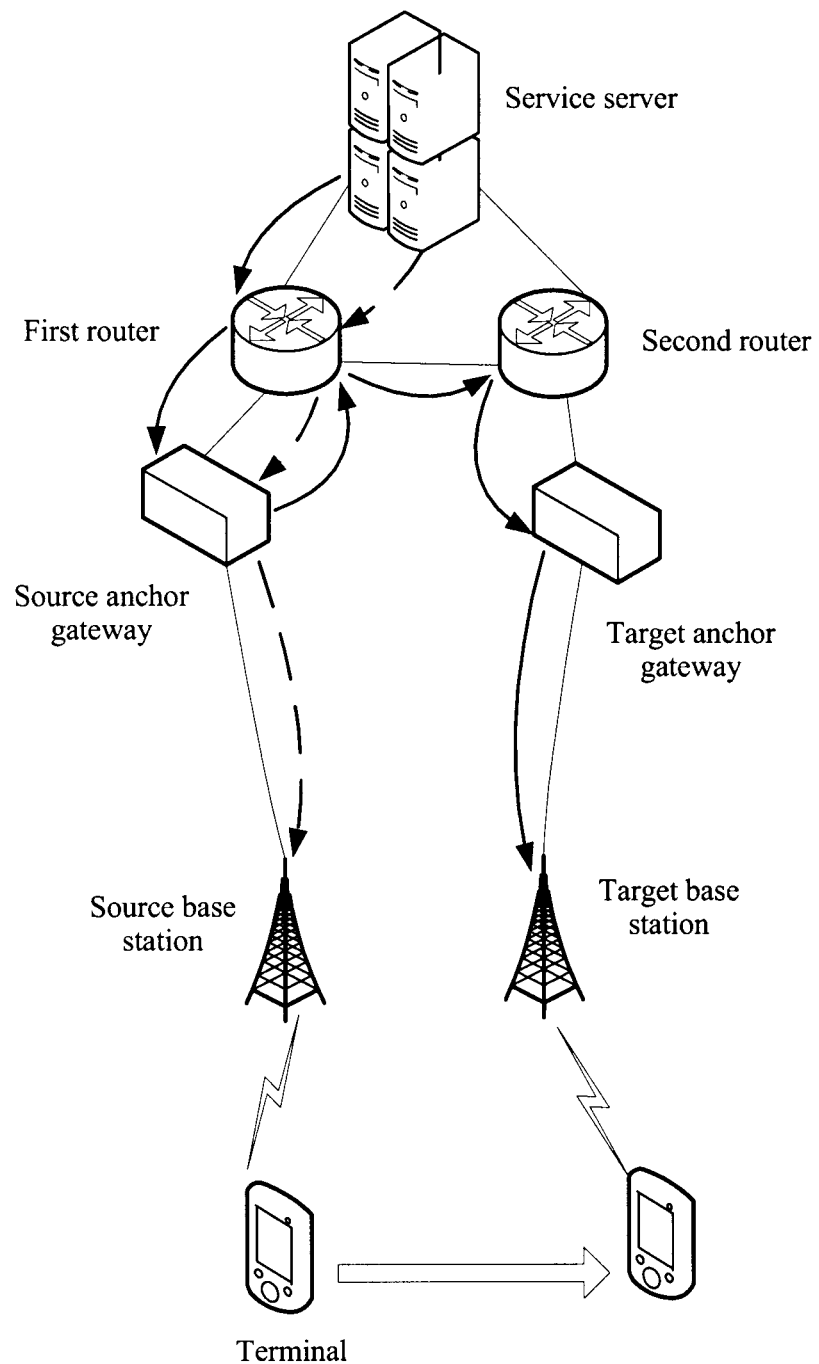
FIG. 1 is a schematic communications diagram of downlink packet transmission according to the prior art.
Figure 2:
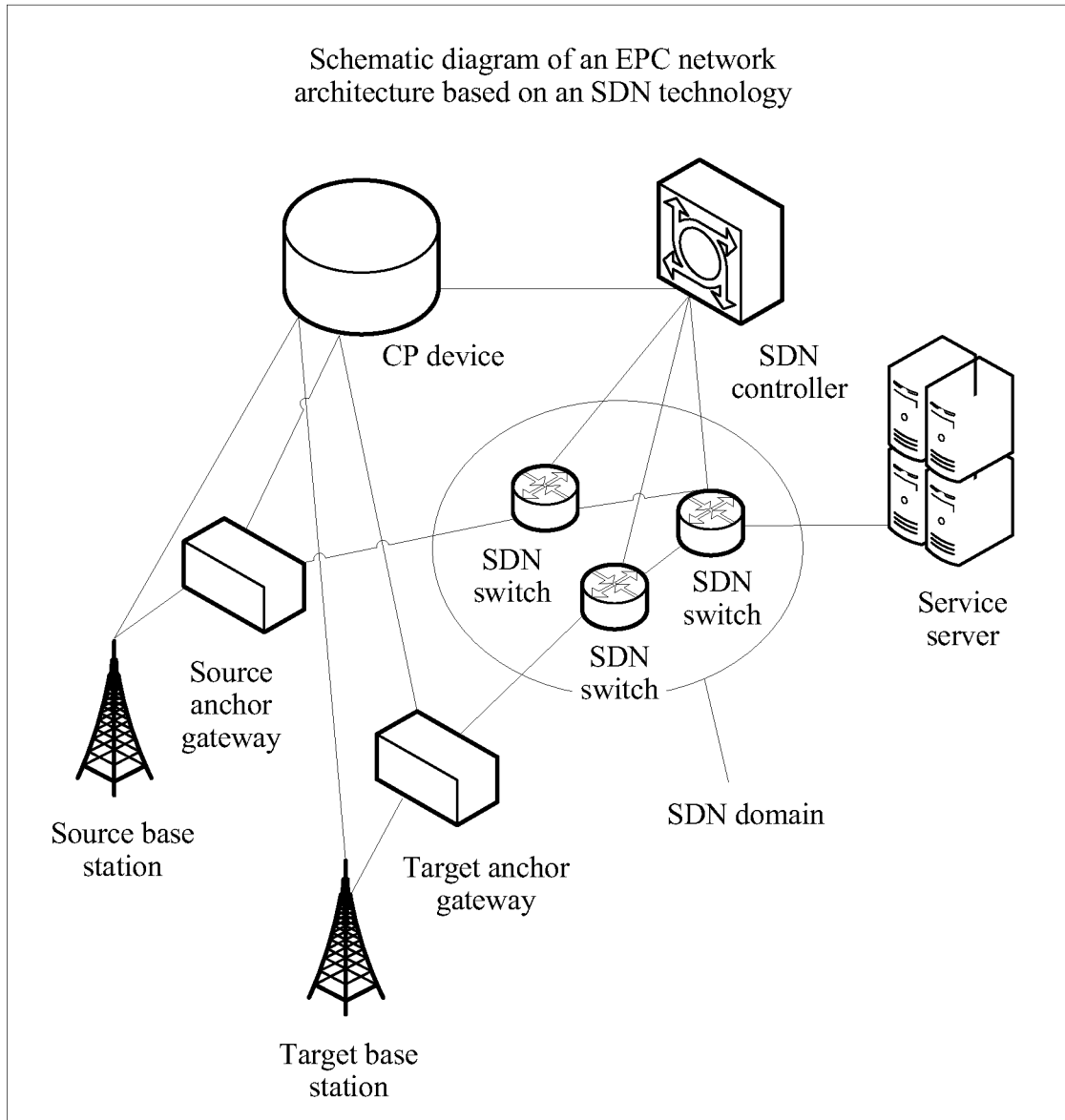
FIG. 2 is a schematic diagram of an EPC network architecture based on an SDN technology according to an embodiment of the present disclosure.

For example, FIG. 2 shows an EPC network architecture based on an SDN technology according to an embodiment of the present disclosure. The EPC network architecture includes a service server, a source anchor gateway, a target anchor gateway, a CP device, an SDN controller, an SDN switch, a source base station, and a target base station. The source base station and the source anchor gateway are connected to the CP device. The target base station and the target anchor gateway are connected to the CP device. The CP device is connected to the source anchor gateway, the target anchor gateway, and the SDN controller. The SDN controller is connected to the SDN switch in the SDN domain. The source anchor gateway and the target anchor gateway are separately connected to the service server by using the SDN switch in the SDN domain.

It should be noted that network architectures and service scenarios described in the embodiments of the present disclosure are to describe the technical solutions in the embodiments of the present disclosure more clearly, but are not intended to limit the technical solutions provided in the embodiments of the present disclosure. A person of ordinary skill in the art may understand that, with evolution of the network architecture and appearance of a new service scenario, the technical solutions provided in the embodiments of the present disclosure may also be applicable to a similar technical solution.

Currently, the anchor gateway is connected to the service server by using a conventional routing device, and the conventional routing device may send a downlink packet of the terminal to the source anchor gateway based on an existing routing table. If the source anchor gateway is switched, because the conventional routing device cannot update the routing table in time, the conventional routing device continues to send the downlink packet of the terminal to the source anchor gateway. As a result, a packet is lost, and a service of the terminal is interrupted. Therefore, even if a more proper target anchor gateway exists, the source anchor gateway may not be switched, and the packet of the terminal is forwarded by using both the source anchor gateway and the target anchor gateway. In this way, although continuity of the service can be ensured, the packet of the terminal may be transmitted in a roundabout path.

Therefore, the embodiments of the present disclosure provide an anchor gateway switching method. In the EPC network architecture based on the SDN technology, when the CP device switches the source anchor gateway, an identifier of the terminal and an identifier of the target anchor gateway are sent to the SDN controller, so that the SDN controller updates, based on the identifier of the terminal and the identifier of the target anchor gateway, a forwarding flow table corresponding to the downlink packet of the terminal. The SDN controller sends an updated forwarding flow table to the SDN switch, so that after receiving the downlink packet of the terminal, the SDN switch can directly send the downlink packet to the target anchor gateway based on the updated forwarding flow table, and the target anchor gateway forwards the downlink packet for the terminal. Therefore, the downlink packet of the terminal does not need to be forwarded by the source anchor gateway. This avoids transmitting the downlink packet in the roundabout forwarding path, and reduces a packet loss rate of the downlink packet in a transmission process.

Figure 3A:
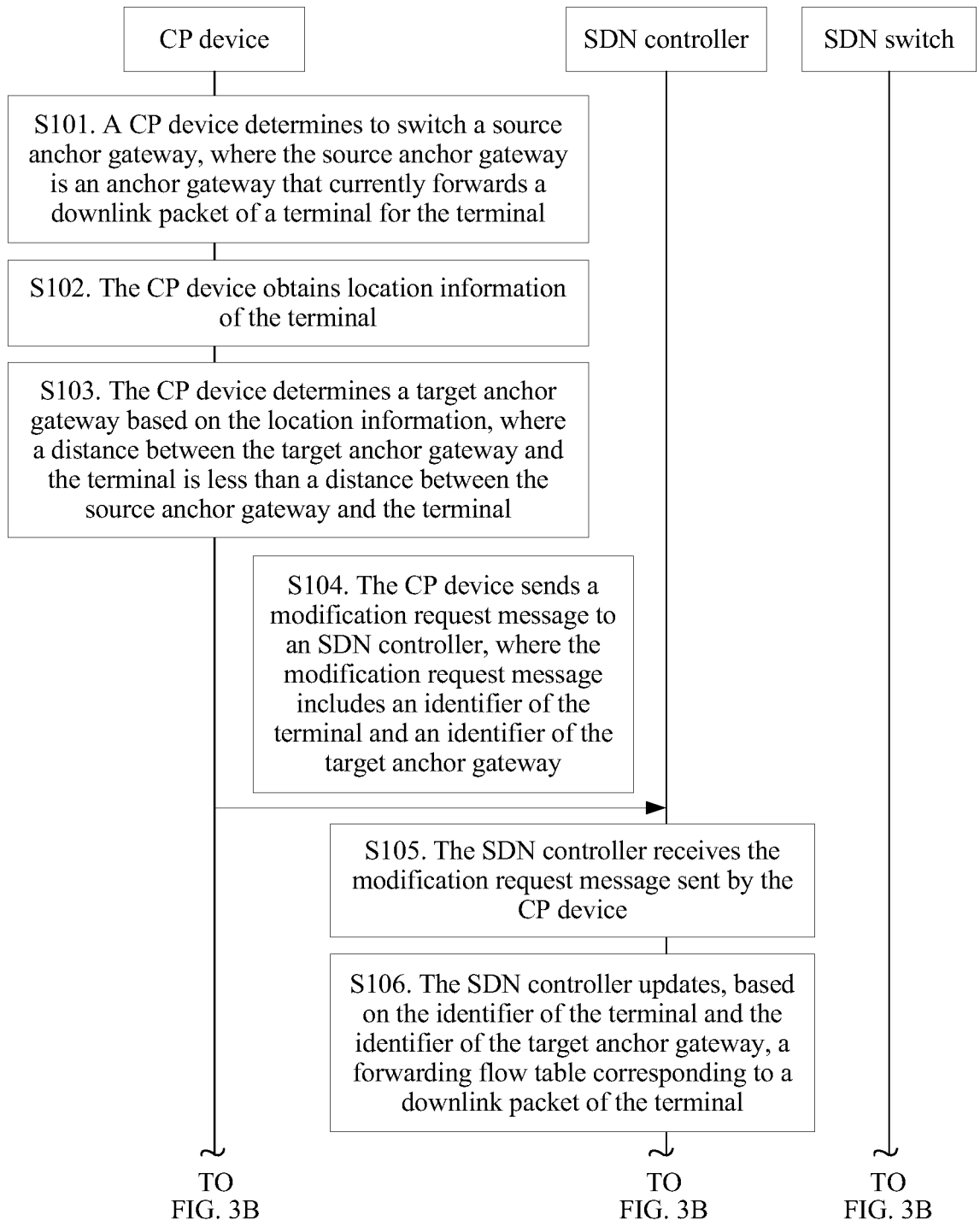
FIG. 3A and FIG. 3B are schematic communications diagram 1 of an anchor gateway switching method according to an embodiment of the present disclosure.
Figure 3B:
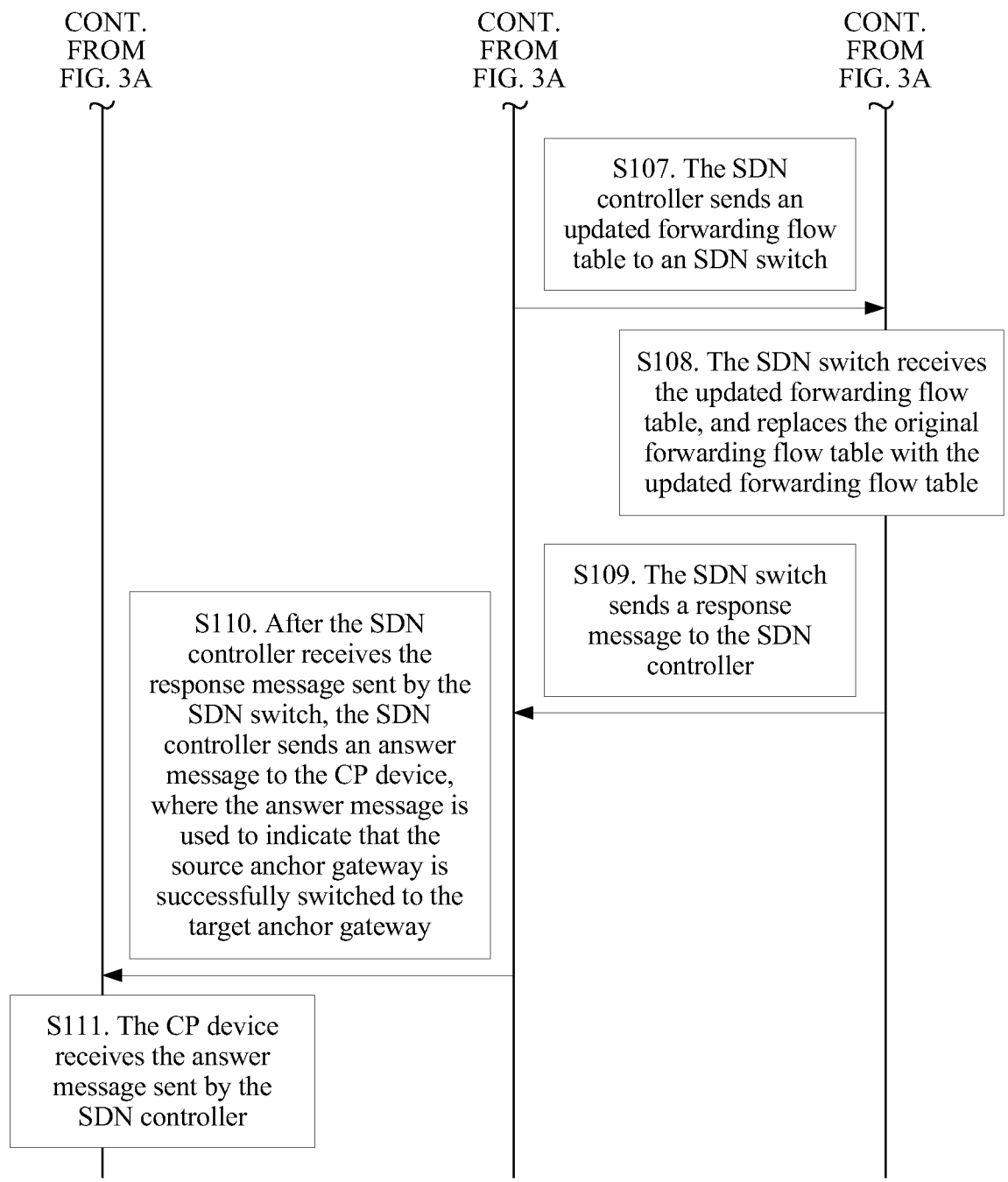

Based on the network architecture shown in FIG. 2, an embodiment of the present disclosure provides an anchor gateway switching method. As shown in FIG. 3A and FIG. 3B, the method may include the following operations.

S101. A CP device determines to switch a source anchor gateway, where the source anchor gateway is an anchor gateway that currently forwards a downlink packet of a terminal for the terminal.

It should be noted that when the anchor gateway switching method provided in this embodiment of the present disclosure is applied to different scenarios, the CP device may determine, in different manners, that the source anchor gateway needs to be switched. A manner in which the CP device determines to switch the source anchor gateway may be described in detail in the following embodiments with reference to specific application scenarios. Details are not described herein.

S102. The CP device obtains location information of the terminal.

The location information of the terminal may be an evolved universal terrestrial radio access network cell global identifier (EC GI) of the terminal, location information obtained by using the Global Positioning System (GPS), or the like.

In this embodiment of the present disclosure, the CP device may exchange information with a base station in which the terminal is located, to obtain the location information of the terminal that is provided by the base station.

S103. The CP device determines a target anchor gateway based on the location information.

In an example, the CP device may select, based on the location information, an anchor gateway that can serve the terminal as the target anchor gateway, or select an anchor gateway that is closest to a network topology of the terminal as the target anchor gateway.

Further, when obtaining the location information of the terminal, the CP device may further obtain type information of the terminal that is provided by the base station in which the terminal is located, so that the CP device can determine, based on the location information and the type information of the terminal, an anchor gateway that can serve the terminal and that meets the type information as the target anchor gateway.

The type information includes at least one of a type of the terminal and a type of a service of the terminal. For example, the type of the terminal may be an intelligent terminal, an Internet of Things (IoT) terminal, or the like. The type of the service may be an access point name (APN) type, an application type, or the like.

For example, in a possible scenario, when the terminal requests for different services, different anchor gateways may be used to provide an access service for the services of the terminal. In other words, the anchor gateway is corresponding to the service of the terminal, and one anchor gateway may provide the access service for only one or more types of services. In this case, when obtaining the location information of the terminal, the CP device further needs to obtain the type of the service of the terminal, so that the CP device can select, based on the location information and the type of the service of the terminal, an anchor gateway that can serve the terminal and that can provide an access service for the service of the terminal as the target anchor gateway.

Preferably, the CP device may select an anchor gateway that can provide the access service for the service of the terminal and that is closest to the network topology of the terminal as the target anchor gateway.

Optionally, in a possible scenario, different anchor gateways can be selected for different types of terminals. When obtaining the location information of the terminal, the CP device further needs to obtain the type of the terminal. For example, if the terminal is an intelligent terminal, after obtaining location information of the intelligent terminal, the CP device can select an anchor gateway that can serve the intelligent terminal and that is closest to a network topology of the terminal as the target anchor gateway.

It may be understood that after determining the target anchor gateway, the CP device can exchange information with the target anchor gateway, to notify the target anchor gateway to set a context corresponding to the downlink packet of the terminal, so that after receiving the downlink packet, the target anchor gateway may forward the downlink packet based on the context.

For a method in which the CP device notifies the anchor gateway to set the context that is used to forward the packet, refer to a corresponding procedure in the prior art. Details are not described herein.

S104. The CP device sends a modification request message to an SDN controller, where the modification request message includes an identifier of the terminal and an identifier of the target anchor gateway.

The modification request message is used to notify the SDN controller, based on the identifier of the terminal and the identifier of the target anchor gateway, to update a forwarding flow table corresponding to the downlink packet of the terminal. In this embodiment of the present disclosure, the CP device uses the identifier of the terminal and the identifier of the target anchor gateway to indicate a correspondence between the terminal and the target anchor gateway. The CP device sends the modification request message carrying the correspondence to the SDN controller, to notify the SDN controller to update, based on the correspondence, the forwarding flow table corresponding to the downlink packet of the terminal.

Further, if the CP device determines the target anchor gateway based on the location information of the terminal and the type of the service of the terminal, before sending the modification request message to the SDN controller, the CP device may first determine information about the service of the terminal, and then add the information about the service to the modification request message, to notify the SDN controller to update, based on the identifier of the terminal, the identifier of the target anchor gateway, and the information about the service, the forwarding flow table corresponding to the downlink packet of the terminal. In other words, the CP device indicates a correspondence between the service of the terminal and the target anchor gateway by using the identifier of the terminal, the identifier of the target anchor gateway, and the information about the service.

The identifier of the terminal may be an IP address of the terminal, an ID of the terminal, or another character that can uniquely indicate the terminal. The identifier of the target anchor gateway may be an IP address of the target anchor gateway, an ID of the target anchor gateway, or another character that can uniquely indicate the target anchor gateway and that is preconfigured on the CP device and the SDN controller. The information about the service may include the identifier of the terminal and an identifier of a server corresponding to the service. Alternatively, the information about the service may be 5-tuple information of a packet corresponding to the service or a part of the 5-tuple information. The 5-tuple information includes a source IP address, a source port number, a destination IP address, a destination port number, and a transport layer protocol.

S105. The SDN controller receives the modification request message from the CP device.

S106. The SDN controller updates, based on the identifier of the terminal and the identifier of the target anchor gateway, a forwarding flow table corresponding to the downlink packet of the terminal.

The SDN controller may update topology information of the terminal based on the identifier of the terminal and the identifier of the target anchor gateway (in other words, the correspondence between the terminal and the target anchor gateway), and generate, based on new topology information, a new forwarding flow table corresponding to the downlink packet of the terminal, to update the forwarding flow table corresponding to the downlink packet.

Optionally, if the modification request message further includes the information about the service, the SDN controller may update topology information of the terminal based on the correspondence between the terminal and the target anchor gateway, and generate, with reference to the information about the service and new topology information, a new forwarding flow table corresponding to the downlink packet of the service of the terminal, to update the forwarding flow table corresponding to the downlink packet.

S107. The SDN controller sends an updated forwarding flow table to an SDN switch.

S108. The SDN switch receives the updated forwarding flow table, and replaces the original forwarding flow table with the updated forwarding flow table.

For example, the SDN controller may send a modify flow entry request message carrying the updated forwarding flow table to the SDN switch, to notify the SDN switch to replace the original forwarding flow table (the forwarding flow table corresponding to the downlink packet of the terminal before the update) with the updated forwarding flow table.

In this embodiment of the present disclosure, after the SDN switch stores the updated forwarding flow table, the SDN switch may directly transmit the downlink packet of the terminal with the target anchor gateway. When receiving a downlink packet from a service server, the SDN switch does not need to send the downlink packet to the target anchor gateway by using the source anchor gateway. The SDN switch may directly send the downlink packet to the target anchor gateway, and the target anchor gateway forwards the downlink packet. In other words, in the anchor gateway switching method provided in this embodiment of the present disclosure, based on the SDN technology, the downlink packet of the terminal does not need to be transmitted by the source anchor gateway. This avoids transmitting the downlink packet in a roundabout forwarding path, and reduces a packet loss rate of the downlink packet in a transmission process.

S109. The SDN switch sends a response message to the SDN controller.

After the SDN switch completes updating the forwarding flow table, the SDN switch may send the response message to the SDN controller, to notify the SDN controller of completing updating the forwarding flow table. In this embodiment of the present disclosure, when the SDN switch completes updating the forwarding flow table, it indicates that the source anchor gateway is successfully switched to the target anchor gateway.

Optionally, in this embodiment of the present disclosure, the SDN controller may further notify the CP device that the source anchor gateway is successfully switched to the target anchor gateway. For example, after S109, the method may further include the following operations.

S110. After the SDN controller receives the response message from the SDN switch, the SDN controller sends an answer message to the CP device, where the answer message is used to indicate that the source anchor gateway is successfully switched to the target anchor gateway.

S111. The CP device receives the answer message from the SDN controller.

In the anchor gateway switching method provided in this embodiment of the present disclosure, the CP device may determine the target anchor gateway based on current location information of the terminal, and send the identifier of the terminal and the identifier of the target anchor gateway to the SDN controller, so that the SDN controller updates, based on the identifier of the terminal and the identifier of the target anchor gateway, the forwarding flow table corresponding to the downlink packet of the terminal. The SDN controller sends the updated forwarding flow table to the SDN switch, so that after receiving the downlink packet of the terminal, the SDN switch can send the downlink packet to the target anchor gateway based on the updated forwarding flow table, and the target anchor gateway forwards the downlink packet for the terminal. This avoids transmitting the downlink packet in a roundabout forwarding path, and reduces a packet loss rate of the downlink packet in a transmission process.

It should be noted that the anchor gateway switching method provided in this embodiment of the present disclosure may be applied to a plurality of scenarios. The following uses four possible application scenarios as an example for description.

For example, when a base station serving the terminal is switched, because an anchor gateway connected to a target base station and an anchor gateway connected to a source base station may not be the same, the downlink packet of the terminal may be transmitted in a roundabout path. The anchor gateway switching method provided in this embodiment of the present disclosure may be applied to a base station switching scenario.

For example, an X2-based handover process can implement handover between base stations, and the X2 is an interface between base stations. The anchor gateway switching method provided in this embodiment of the present disclosure may be applied to the X2-based handover process.

Figure 4A:
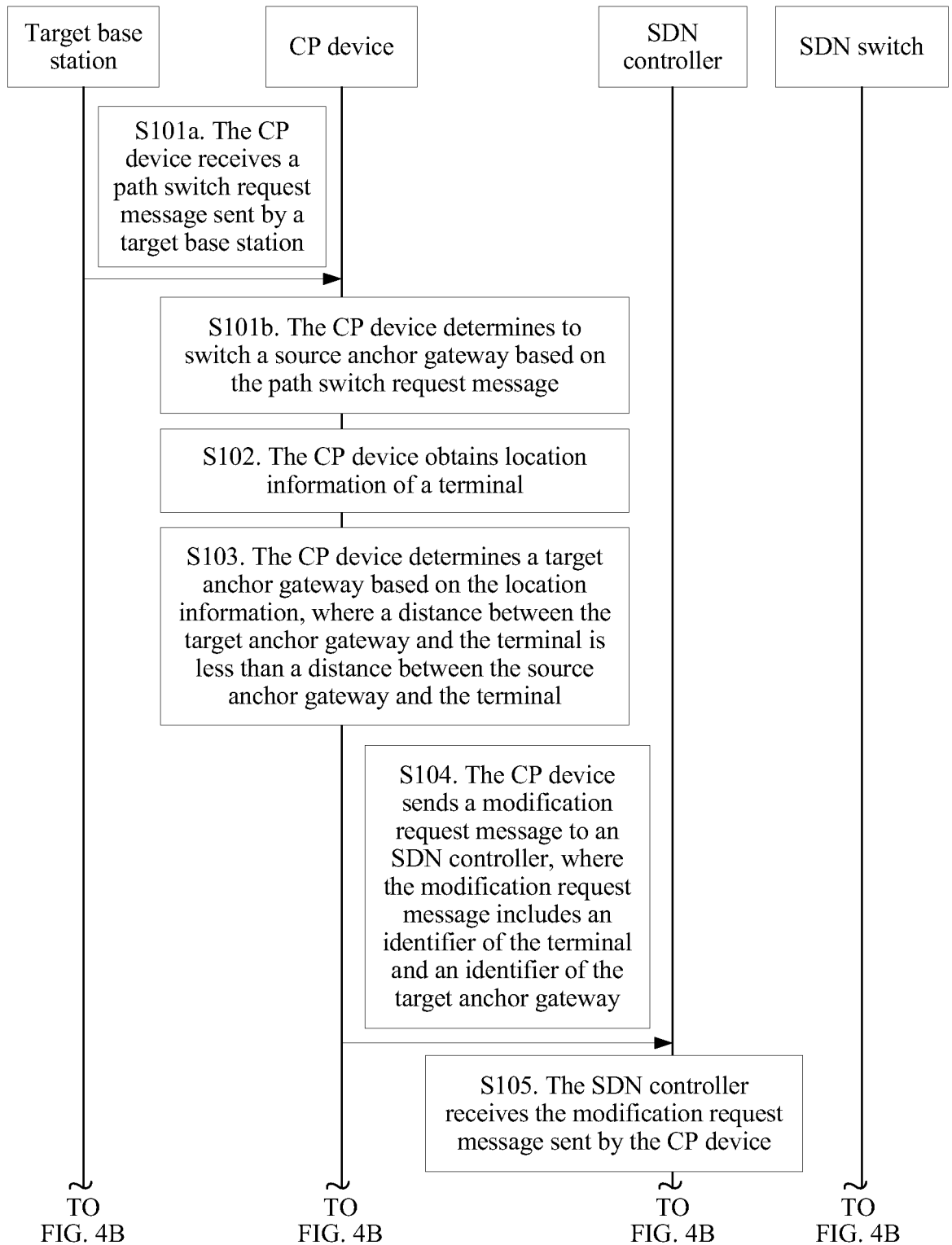
FIG. 4A and FIG. 4B are schematic communications diagram 2 of an anchor gateway switching method according to an embodiment of the present disclosure.
Figure 4B:
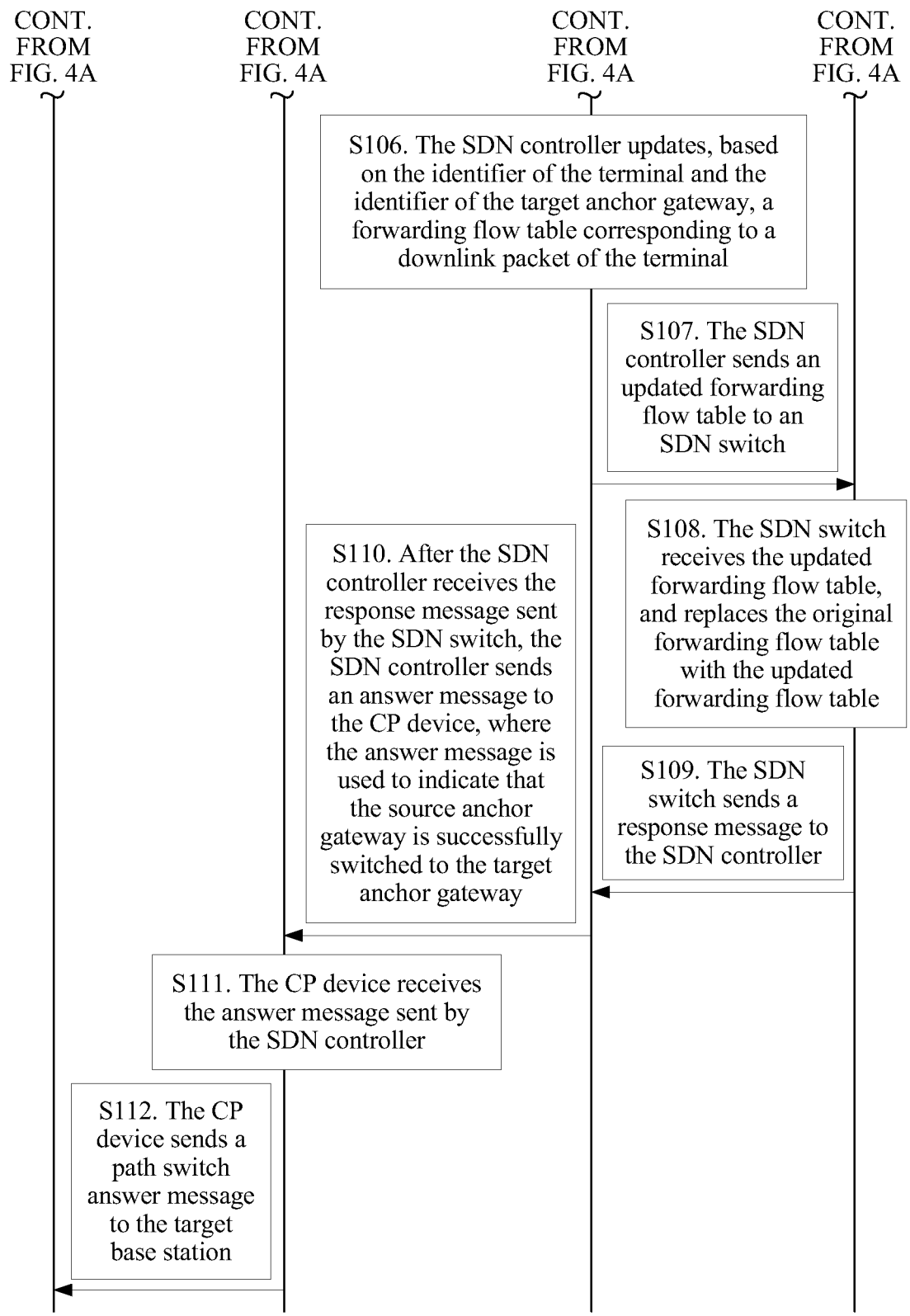

With reference to FIG. 3A and FIG. 3B, as shown in FIG. 4A and FIG. 4B, in this embodiment of the present disclosure, S101 may include the following operations.

S101a. The CP device receives a path switch request message from a target base station.

It may be understood that when the terminal is handed over from the source base station to the target base station, the target base station may send the path switch request message to the CP device. The path switch request message includes an identifier of the target base station and bearer switch information, to notify the CP device that the terminal has been switched to the target base station. The bearer switch information is an interface through which the target base station receives the downlink packet of the terminal. In this embodiment of the present disclosure, the CP device may trigger an anchor gateway switching process based on the path switch request message.

S101b. The CP device determines to switch the source anchor gateway based on the path switch request message.

Further, after the CP device determines to switch the source anchor gateway based on the path switch request message, the source anchor gateway may be switched to the target anchor gateway according to the method described in S102 to S111. The SDN switch may directly transmit the downlink packet of the terminal with the target anchor gateway without the need of forwarding the downlink packet by using the source anchor gateway, so that the downlink packet of the terminal does not need to be transmitted in a roundabout forwarding path, and a packet loss rate of the downlink packet of the terminal in a transmission process is reduced.

Further, after S111, the method further includes the following operations.

S112. The CP device sends a path switch answer message to the target base station, where the path switch answer message is used to notify the target base station to establish an uplink interface through which the target base station exchanges information with the target anchor gateway.

In an example, when the source anchor gateway is switched to the target anchor gateway, the CP device needs to notify the target base station of establishing the uplink interface through which the target base station exchanges information with the target anchor gateway, so that when receiving an uplink packet from the terminal, the target base station can send the uplink packet to the target anchor gateway by using the uplink interface.

Optionally, an S1-based handover process can also implement handover between base stations, and the S1 is an interface between the base station and an MME in the CP device. The anchor gateway switching method provided in this embodiment of the present disclosure may be applied to the S1-based handover process.

Figure 5A:
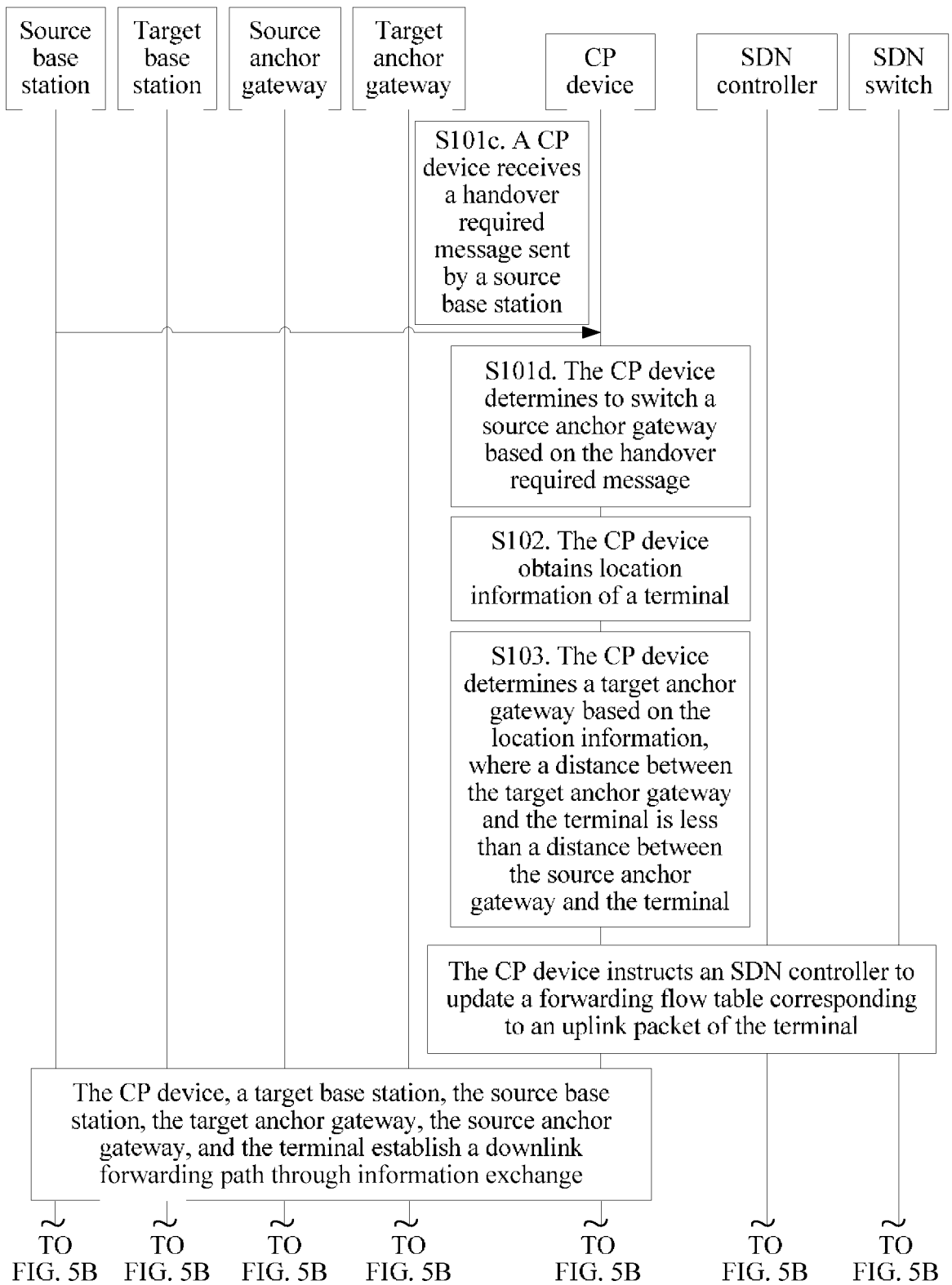
FIG. 5A to FIG. 5C are schematic communications diagram 3 of an anchor gateway switching method according to an embodiment of the present disclosure.
Figure 5B:
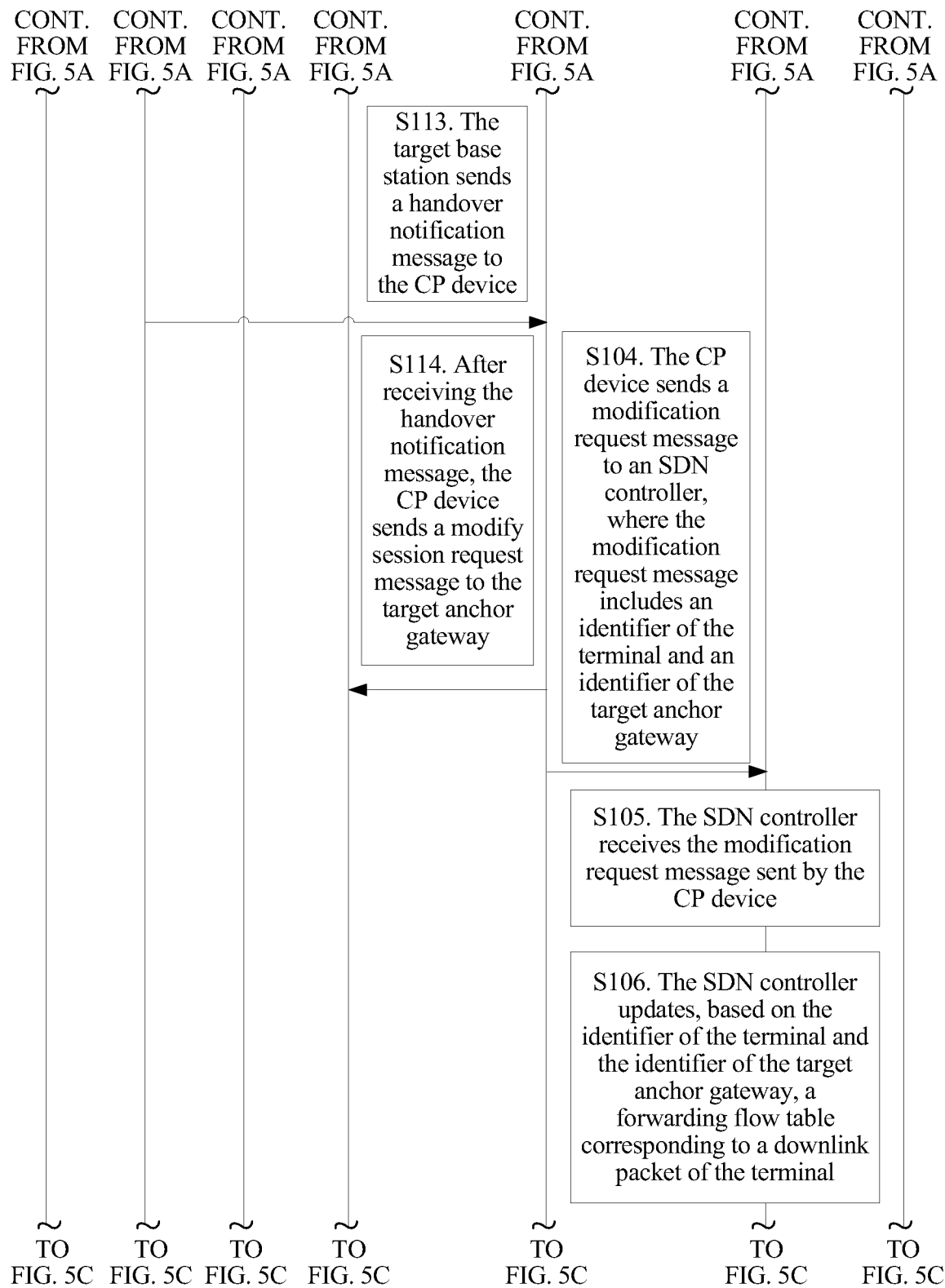
Figure 5C:
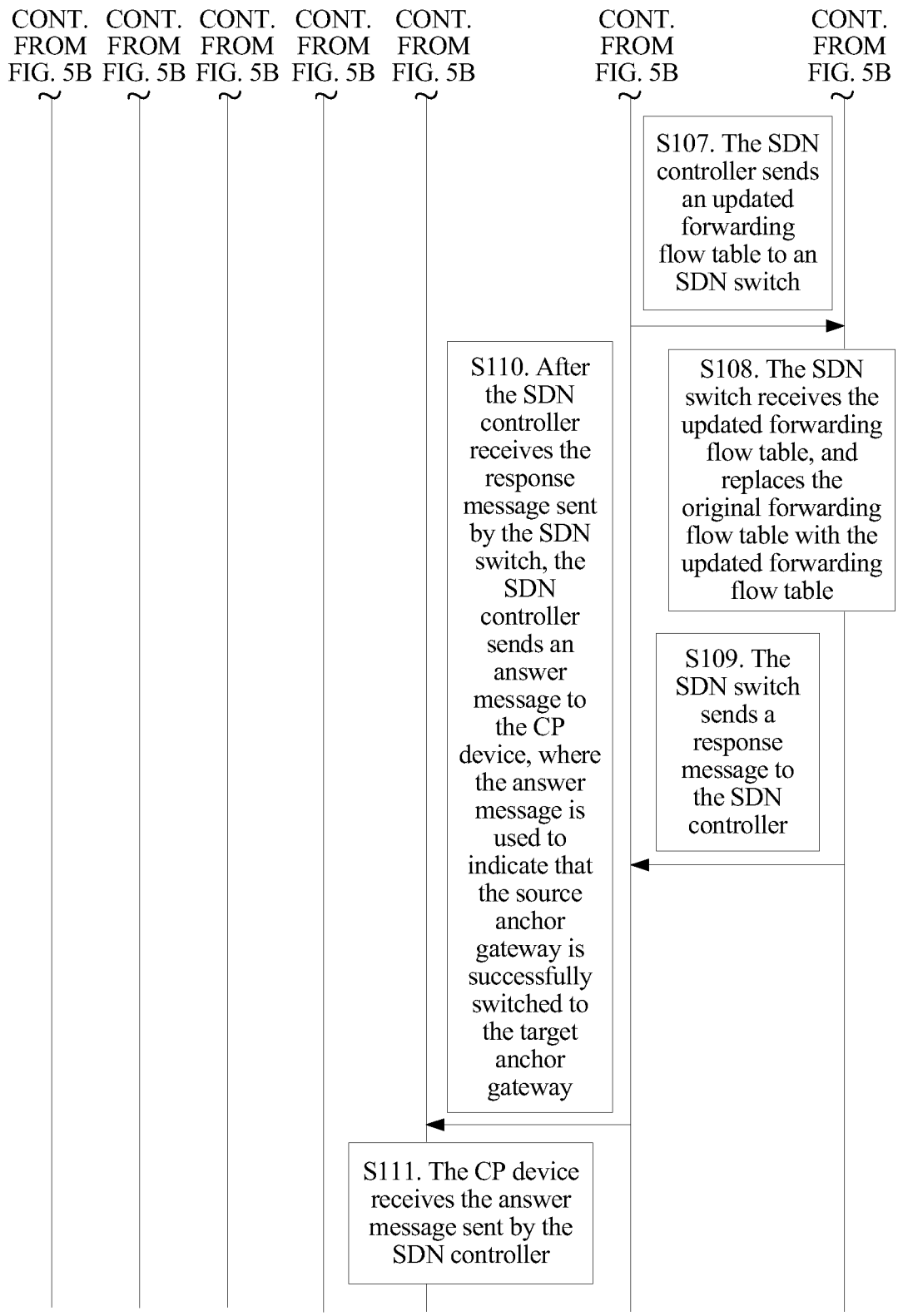

With reference to FIG. 3A and FIG. 3B, as shown in FIG. 5A to FIG. 5C, in this embodiment of the present disclosure, S101 may include the following operations.

S101c. The CP device receives a handover required message from a source base station.

It should be noted that in the X2-based handover process, the source base station cannot directly initiate handover to the target base station, and therefore, the source base station needs to send the handover required message to the CP device. The handover required message including an identifier of the target base station is used to request the CP device to notify the target base station and determine the target anchor gateway. In this embodiment of the present disclosure, when receiving the handover required message, the CP device may determine that the source anchor gateway needs to be switched.

S101d. The CP device determines to switch the source anchor gateway based on the handover required message.

It may be understood that after determining to switch the source anchor gateway, according to the method described in S102 to S103, the CP device may determine the target anchor gateway based on the location information of the terminal.

Further, after the CP device determines the target anchor gateway, if the forwarding flow table used to notify the SDN switch to forward a packet is determined by the SDN controller based on a bond relationship between forwarding information of the packet and the anchor gateway currently serving the terminal. The bond relationship may be indicated by using a correspondence between the forwarding information and the identifier of the anchor gateway, and the forwarding information may include 5-tuple information of the packet or a part of the 5-tuple information. When the source anchor gateway is switched to the target anchor gateway, the SDN switch cannot determine a service server to which the packet sent by the target anchor gateway needs to be forwarded. Therefore, to ensure transmission continuity of the uplink packet of the terminal, after determining the target anchor gateway, the CP device needs to notify the SDN controller to update a forwarding flow table corresponding to the uplink packet of the terminal.

In an example, after the CP device determines the target anchor gateway, the CP device may send an uplink notification message carrying the forwarding information of the uplink packet and the identifier of the anchor gateway to the SDN controller. The SDN controller re-determines, based on the forwarding information and the identifier of the anchor gateway, a forwarding flow table corresponding to the uplink packet, and sends the new forwarding flow table to the SDN switch, so that the SDN switch replaces the originally stored forwarding flow table corresponding to the uplink packet with the new forwarding flow table. Therefore, when receiving the uplink packet from the target anchor gateway, the SDN switch can forward the uplink packet to a corresponding service server. In an example, if the forwarding flow table used to notify the SDN switch to forward a packet is determined by the SDN controller based on the identifier of the terminal and an identifier of the service server, in other words, the SDN switch can forward the uplink packet to the corresponding service server based on the identifier of the terminal when the SDN switch receives the uplink packet that is of the terminal and that is from the target anchor gateway, the CP device does not need to notify the SDN controller to update the forwarding flow table corresponding to the uplink packet.

Further, the CP device notifies the target base station. After the terminal is handed over to the target base station, because the target base station cannot communicate with the source base station, in order that the downlink packet temporarily stored on the source base station can be transmitted to the terminal, the CP device, the target base station, the source base station, the target anchor gateway, the source anchor gateway, and the terminal need to establish a downlink forwarding path through information exchange, so that the downlink packet temporarily stored on the source base station can be forwarded to the terminal by using the downlink forwarding path, thereby avoiding transmission interrupt of the downlink packet that is caused by handover of the base station. The downlink forwarding path is as follows: The source base station sends the temporarily stored downlink packet to the source anchor gateway, the source anchor gateway sends the downlink packet to the target anchor gateway, the target anchor gateway sends the downlink packet to the target base station, and the target base station sends the downlink packet to the terminal.

For establishment of the downlink forwarding path, refer to related description in the existing S1-based handover process. Details are not described herein again.

Further, when the downlink forwarding path is successfully established, the method may further include the following operations.

S113. The target base station sends a handover notification message to the CP device.

S114. After receiving the handover notification message, the CP device sends a modify session request message to the target anchor gateway, where the modify session request message is used to notify the target anchor gateway to establish a downlink interface through which the target anchor gateway exchanges information with the target base station.

After the terminal is successfully handed over to the target base station, the target base station sends the handover notification message to the CP device, to notify the CP device that the source base station is successfully handed over to the target base station. In this embodiment of the present disclosure, after receiving the handover notification message, the CP device may send the modify session request message to the target anchor gateway, to notify the target anchor gateway to establish the downlink interface through which the target anchor gateway exchanges information with the target base station, so that when the target anchor gateway receives the downlink packet from the service server by using the SDN switch, the target anchor gateway can send the downlink packet to the target base station by using the downlink interface.

Further, after successfully establishing the downlink interface, the target anchor gateway may update, according to the method described in S104 to S111 in the embodiment shown in FIG. 3A and FIG. 3B, the forwarding flow table corresponding to the downlink packet of the terminal, so that the SDN switch can directly forward the downlink packet of the terminal to the target anchor gateway, to avoid transmitting the downlink packet of the terminal in a roundabout forwarding path, and reduce a packet loss rate of the downlink packet in a transmission process.

It may be understood that when the source anchor gateway is successfully switched to the target anchor gateway, and after the downlink packet temporarily stored on the source base station is totally transmitted to the terminal, the established downlink forwarding path can be released.

For a process of releasing the downlink forwarding path, refer to related description in the existing S1-based handover process. Details are not described herein again.

Optionally, when the terminal in an idle mode moves and a tracking area (TA) of the terminal changes accordingly, the terminal sends a tracking area update (TAU) request message to the MME by using the base station in which the terminal is currently located, to request the MME to update the TA of the terminal. It may be understood that when the TA of the terminal changes, the anchor gateway serving the terminal may also be changed. Therefore, the anchor gateway switching method provided in this embodiment of the present disclosure may further be applied to a TAU process.

Figure 6A:
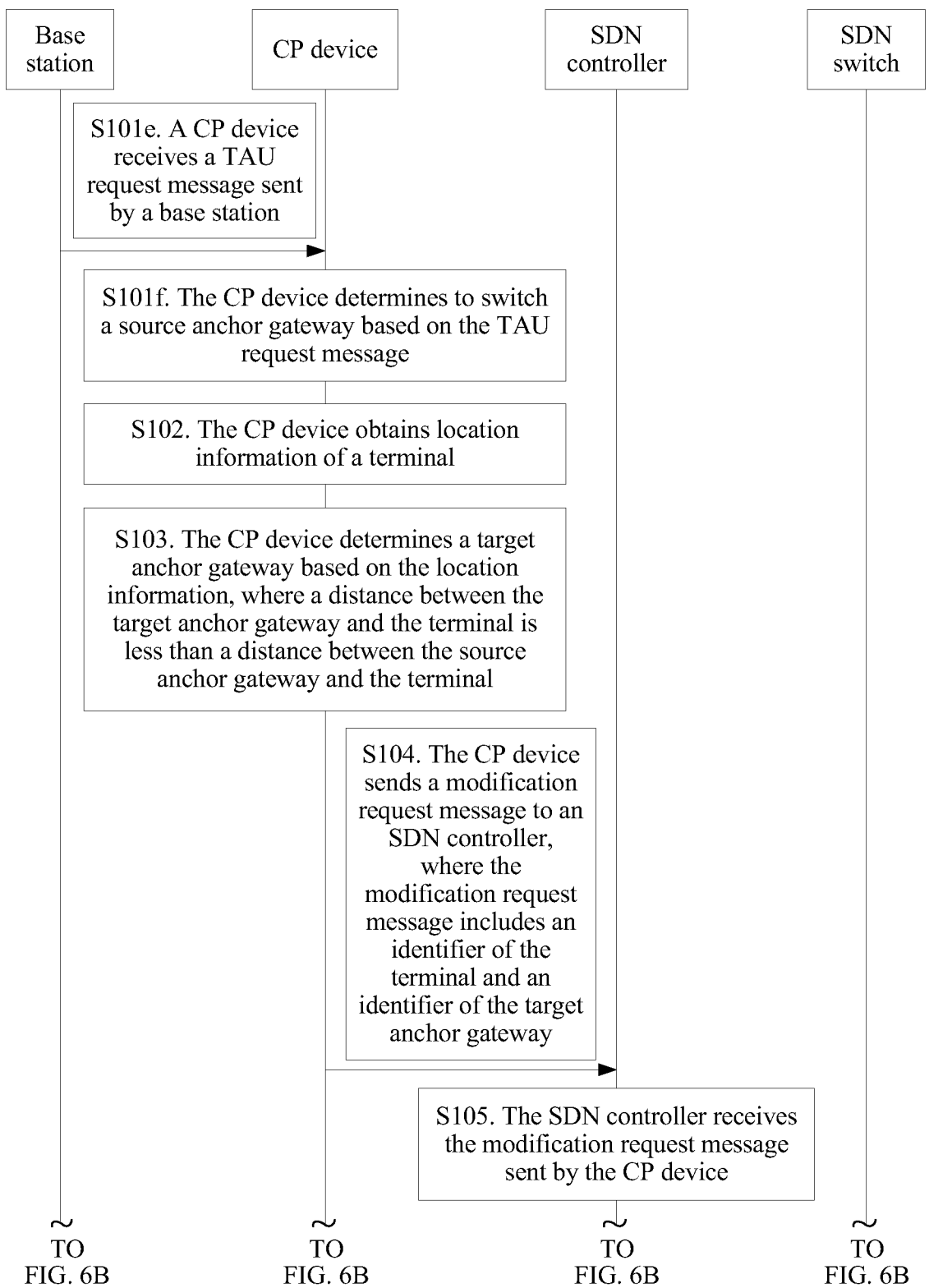
FIG. 6A to FIG. 6C are schematic communications diagram 4 of an anchor gateway switching method according to an embodiment of the present disclosure.
Figure 6B:
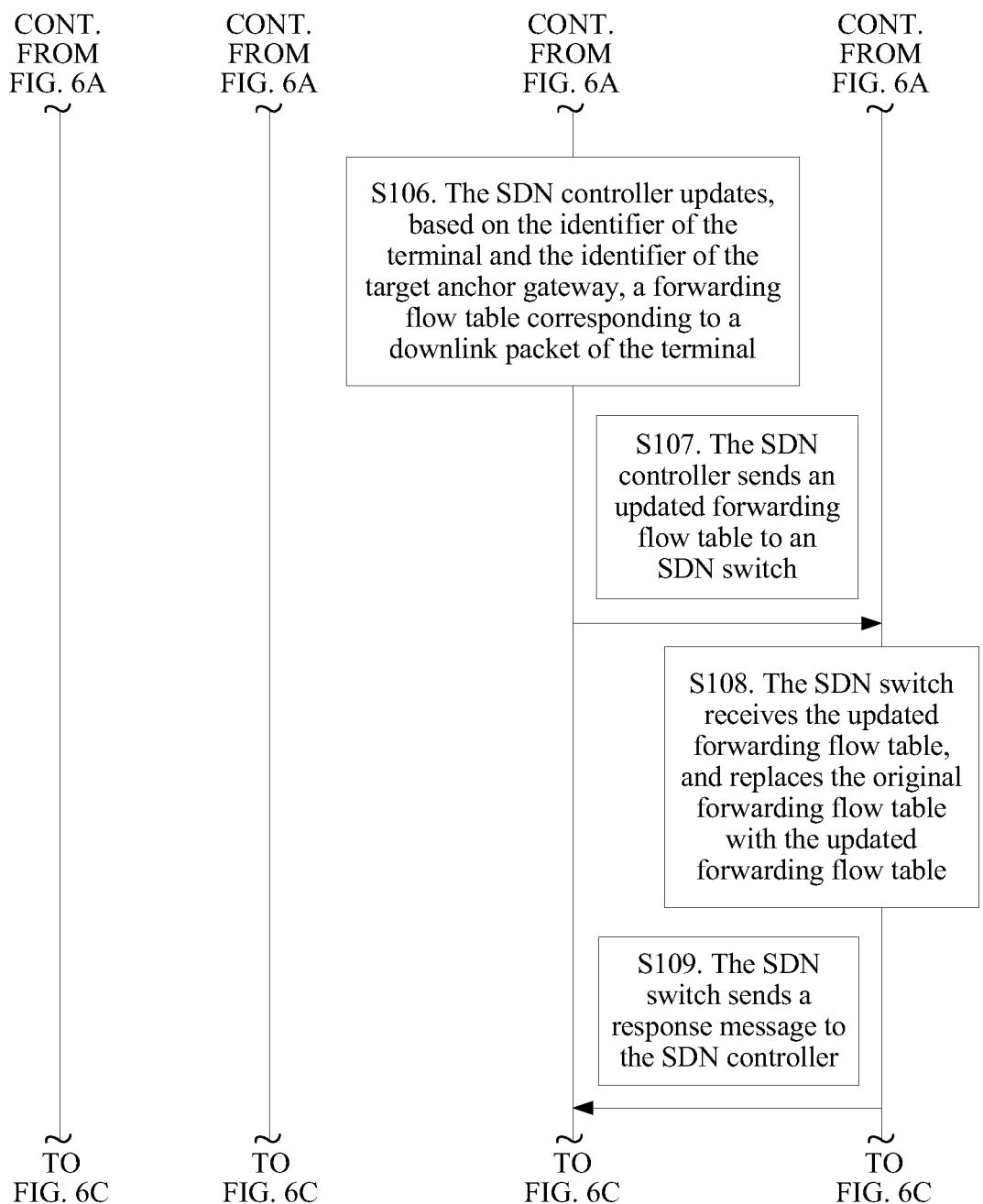
Figure 6C:
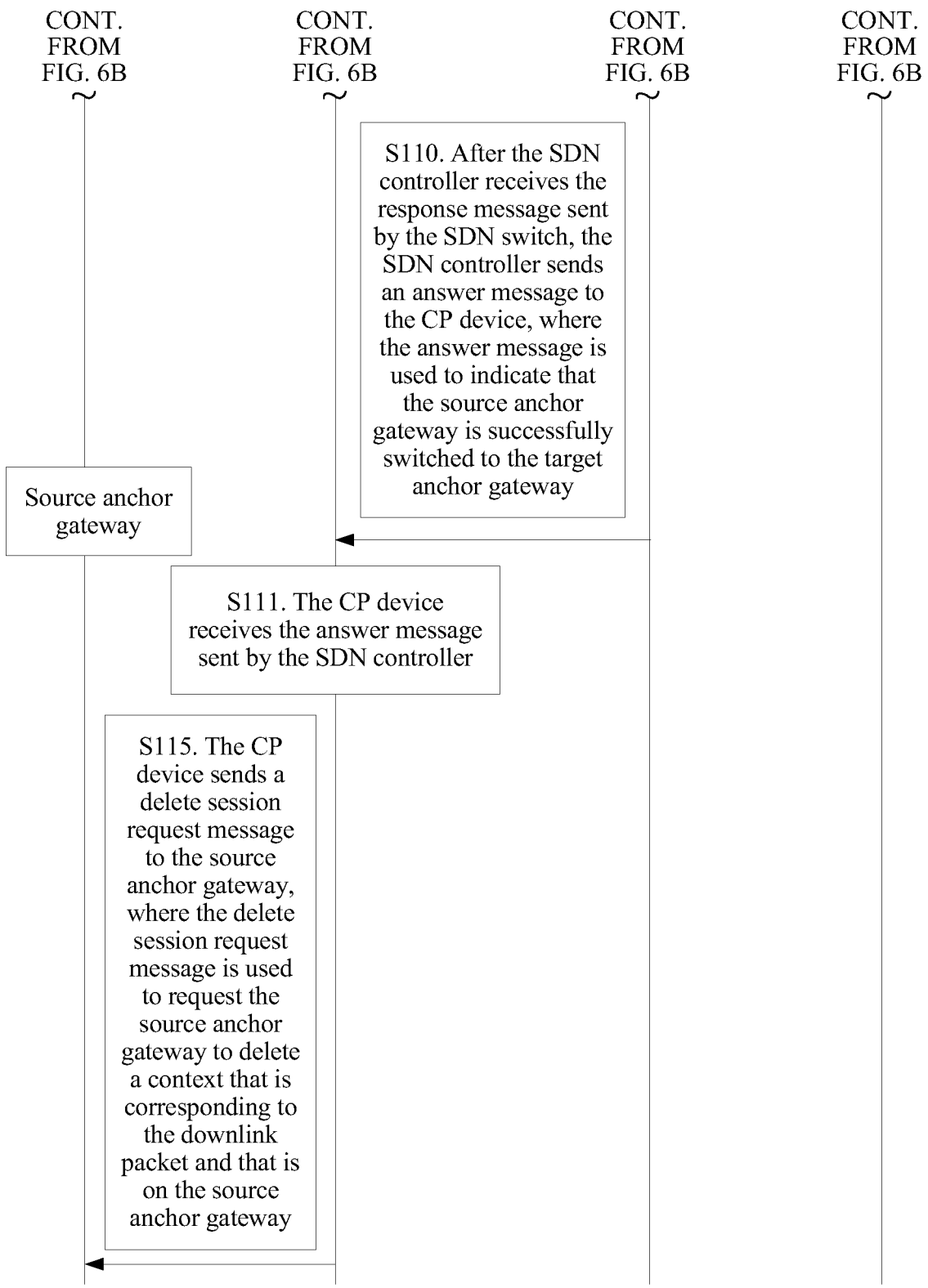

With reference to FIG. 3A and FIG. 3B, as shown in FIG. 6A to FIG. 6C, S101 may include the following operations.

S101e. The CP device receives a TAU request message from the base station.

S101f. The CP device determines to switch the source anchor gateway based on the TAU request message.

In this embodiment of the present disclosure, when the CP device receives the TAU request message from the base station, the CP device may determine that the TA of the terminal needs to be updated, and determine to switch the source anchor gateway based on the TAU request message. Therefore, the CP device switches the source anchor gateway to the target anchor gateway according to the method described in S102 to S111. Further, when the service server initiates a service request to the terminal, to page the terminal, the SDN switch can directly forward the downlink packet of the terminal to the target anchor gateway.

Further, after S111, the method further includes the following operations.

S115. The CP device sends a delete session request message to the source anchor gateway, where the delete session request message is used to request the source anchor gateway to delete a context that is corresponding to the downlink packet and that is on the source anchor gateway.

In this embodiment of the present disclosure, when the source anchor gateway is successfully switched to the target anchor gateway according to the method described in S102 to S111, the CP device may send the delete session request message to the source anchor gateway, to notify the source anchor gateway to delete context information corresponding to the downlink packet of the terminal, thereby saving connection resources on the source anchor gateway.

Optionally, if the TA of the terminal is not redesigned, base stations served by different anchor gateways may have a same TA, and the base station cannot initiate the TAU process in time. Therefore, when the terminal is in the idle mode, even if the base station does not initiate the TAU process, the anchor gateway of the terminal may be changed because of moving of the terminal. Therefore, the anchor gateway switching method provided in this embodiment of the present disclosure may also be applied to a service request process.

Figure 7A:
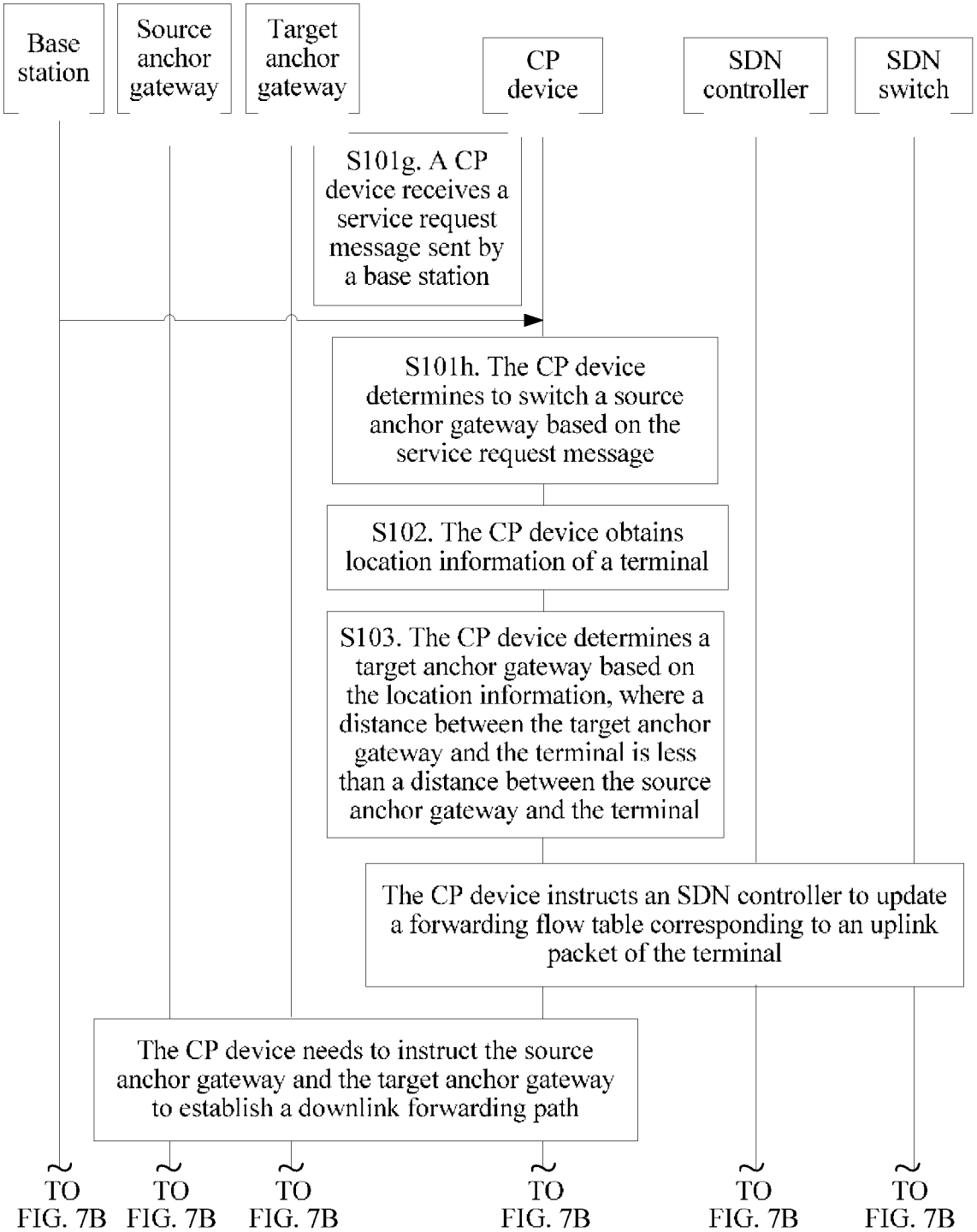
FIG. 7A to FIG. 7C are schematic communications diagram 5 of an anchor gateway switching method according to an embodiment of the present disclosure.
Figure 7B:
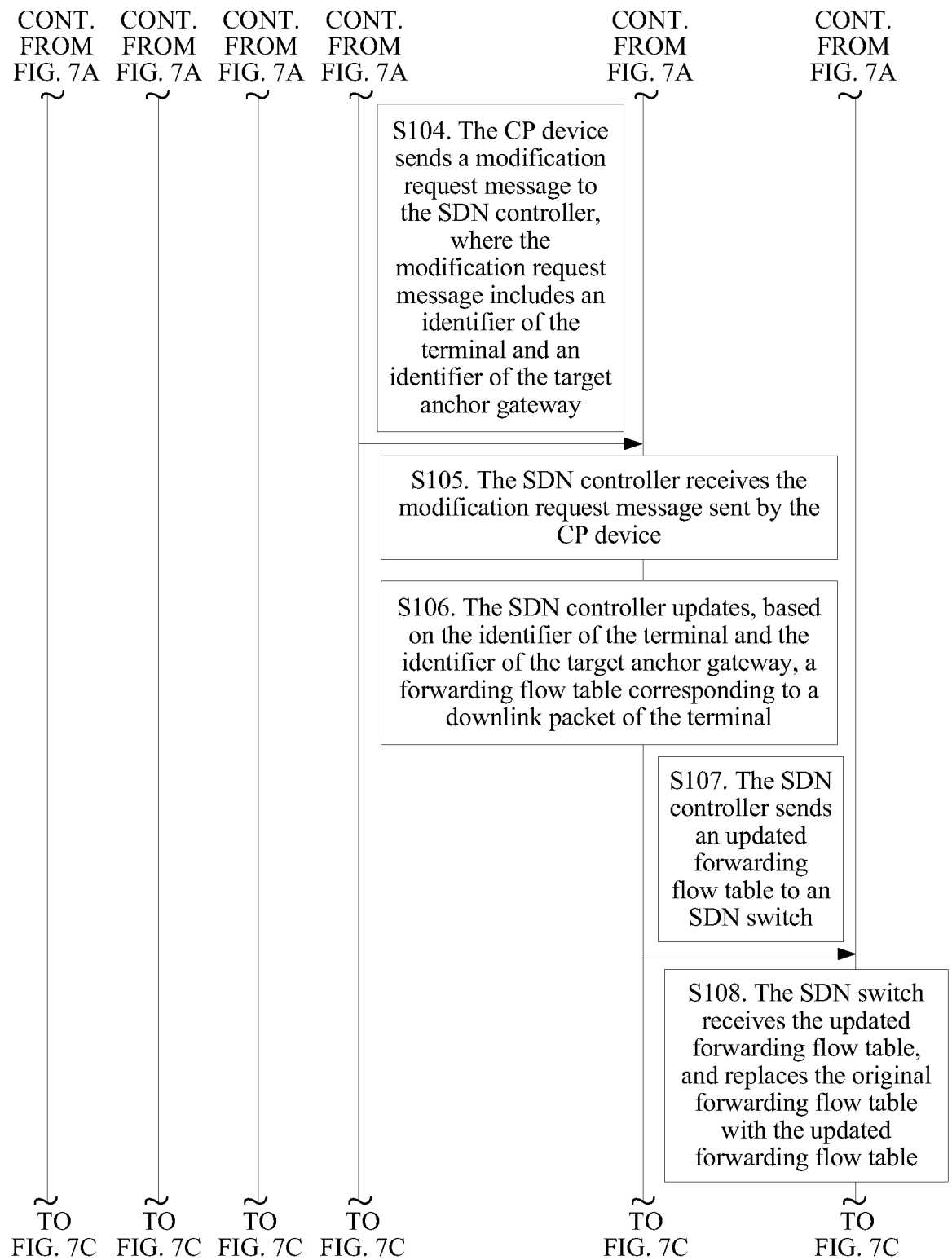
Figure 7C:
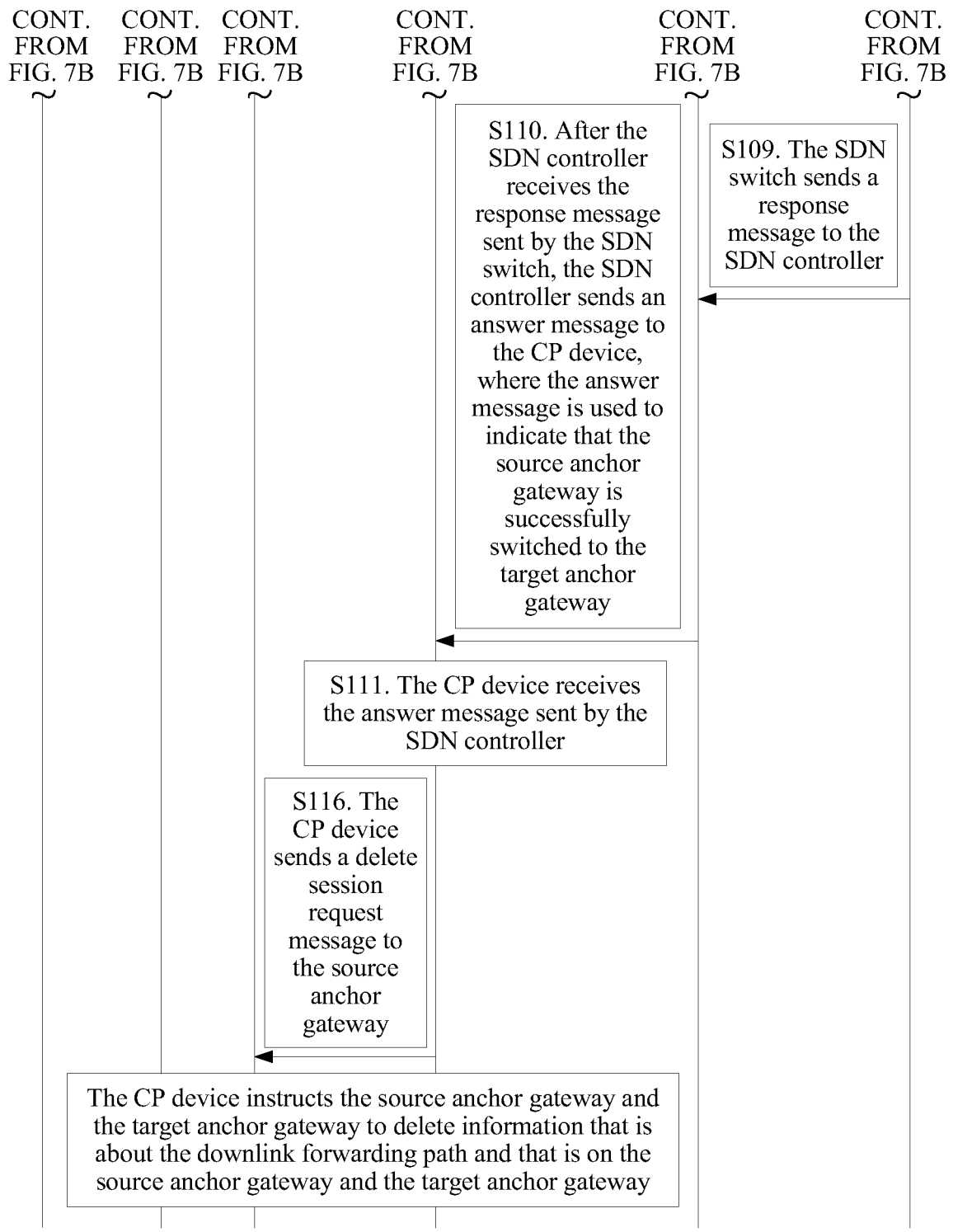

With reference to FIG. 3A and FIG. 3B, as shown in FIG. 7A to FIG. 7C, S101 may include the following operations.

S101g. The CP device receives a service request message from a base station.

It should be noted that if the service request message is from the terminal, when receiving the service request message from the terminal, the base station forwards the service request message to the CP device.

S101h. The CP device determines to switch the source anchor gateway based on the service request message.

In this embodiment of the present disclosure, when receiving the service request message from the base station, the CP device may determine that the anchor gateway needs to be switched, and perform the anchor gateway switching method provided in this embodiment of the present disclosure.

Optionally, after the CP device determines to switch the source anchor gateway based on the service request message, and determines the target anchor gateway according to the method described in S102 to S103, if a forwarding flow table used to notify the SDN switch to forward a packet is determined by the SDN controller based on a bond relationship between forwarding information of the packet and an anchor gateway, the CP device needs to notify, in time, the SDN controller to update the forwarding flow table corresponding to the uplink packet of the terminal, so that when receiving the uplink packet from the target anchor gateway, the SDN switch can forward the uplink packet to a corresponding service server, thereby avoiding transmission interrupt of the current uplink packet.

For a manner in which the CP device notifies the SDN controller to update the forwarding flow table corresponding to the uplink packet of the terminal, refer to the same content described in the embodiment shown in FIG. 5A to FIG. 5C. Details are not described herein again.

Optionally, if the service request is initiated by the service server, the CP device needs to notify the source anchor gateway and the target anchor gateway to establish a downlink forwarding path, so that when the service server initiates the service request, the downlink packet that has been sent to the source anchor gateway can be transmitted to the target anchor gateway by using the downlink forwarding path.

The CP device may send a path establishment request message to the source anchor gateway and the target anchor gateway, to notify the source anchor gateway and the target anchor gateway to establish a downlink connection between the source anchor gateway and the target anchor gateway, so that the source anchor gateway can send the temporarily stored downlink packet to the target anchor gateway, and the target anchor gateway sends the downlink packet to the terminal by using the base station.

Optionally, the source anchor gateway may also send the temporarily stored downlink packet to the CP device, the CP device sends the temporarily stored downlink data to the target anchor gateway, and the target anchor gateway sends the temporarily stored downlink data to the terminal by using the base station.

It should be noted that if the service request is initiated by the terminal, the CP device does not need to establish the downlink forwarding path.

Further, in this embodiment of the present disclosure, after the CP device determines the target anchor gateway, if the forwarding flow table corresponding to the uplink packet of the terminal needs to be updated, and/or the downlink packet forwarding path needs to be established, after the forwarding flow table corresponding to the uplink packet of the terminal is updated, and/or the downlink packet forwarding path is successfully established, the forwarding flow table corresponding to the downlink packet of the terminal may be updated according to the method described in S104 to S111 based on an identifier of the target anchor gateway and an identifier of the terminal, to successfully switch the source anchor gateway to the target anchor gateway. Therefore, after subsequently receiving the downlink packet of the terminal, the SDN switch directly forwards the downlink packet to the target anchor gateway without the need of forwarding the downlink packet by using the source anchor gateway. This avoids transmitting the downlink packet in a roundabout forwarding path, and reduces a packet loss rate of the downlink packet in a transmission process.

It may be understood that if the forwarding flow table corresponding to the uplink packet of the terminal does not need to be updated, and the downlink packet forwarding path does not need to be established, after determining the target anchor gateway, the CP device directly performs the method described in S104 to S111, to successfully switch the source anchor gateway to the target anchor gateway.

Further, after S111, the method further includes the following operations.

S116. The CP device sends the delete session request message to the source anchor gateway.

The delete session request message is used to request the source anchor gateway to delete the context that is corresponding to the downlink packet of the terminal and that is on the source anchor gateway.

Optionally, if the CP device notifies the source anchor gateway and the target anchor gateway to establish the downlink forwarding path, after the source anchor gateway sends all the temporarily stored downlink packet to the target anchor gateway, the CP device may notify the source anchor gateway and the target anchor gateway to delete information that is about the downlink forwarding path and that is on the source anchor gateway and the target anchor gateway.

It should be noted that in addition to the foregoing four possible scenarios, the anchor gateway switching method provided in this embodiment of the present disclosure may be applied to another scenario in which anchor gateway switching may exist. Details are not described in this application.

It should be noted that when the base station serving the terminal in an active mode is handed over, for example, in the foregoing S1-based handover process or X2-based handover process, when the base station serving the terminal in the active mode is handed over from the source base station to the target base station, a transmission path of the downlink packet of the terminal is changed in a transmission process. After the source base station is handed over to the target base station, if the source anchor gateway detects that packet transmission ends on the original path (to be specific, the transmission path of the downlink packet of the terminal when the source base station serves the terminal), the source anchor gateway may send an end packet to the original path, to notify forwarding nodes such as other gateways on the original path, the source base station, and the target base station that packet transmission ends on the path. Therefore, the forwarding nodes such as other gateways on the path, the source base station, and the target base station may delete a context related to the path. The end packet is a general packet radio service (GPRS) tunneling protocol user plane (GTPU) null packet carrying an end marker, and is a specific tunneling packet.

Figure 8A:
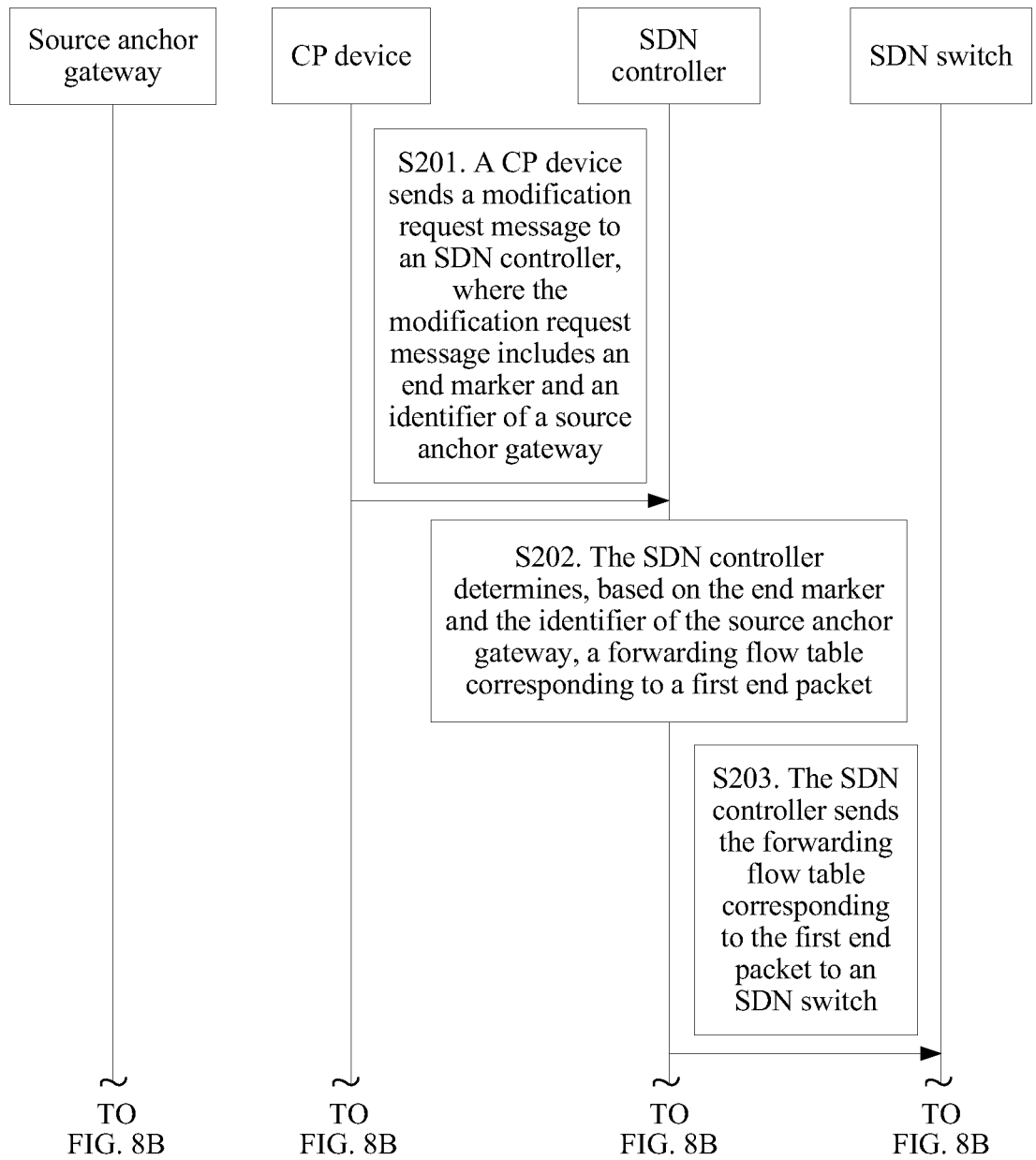
FIG. 8A and FIG. 8B are a schematic communications diagram of a method for triggering a source anchor gateway to send an end packet according to an embodiment of the present disclosure.
Figure 8B:
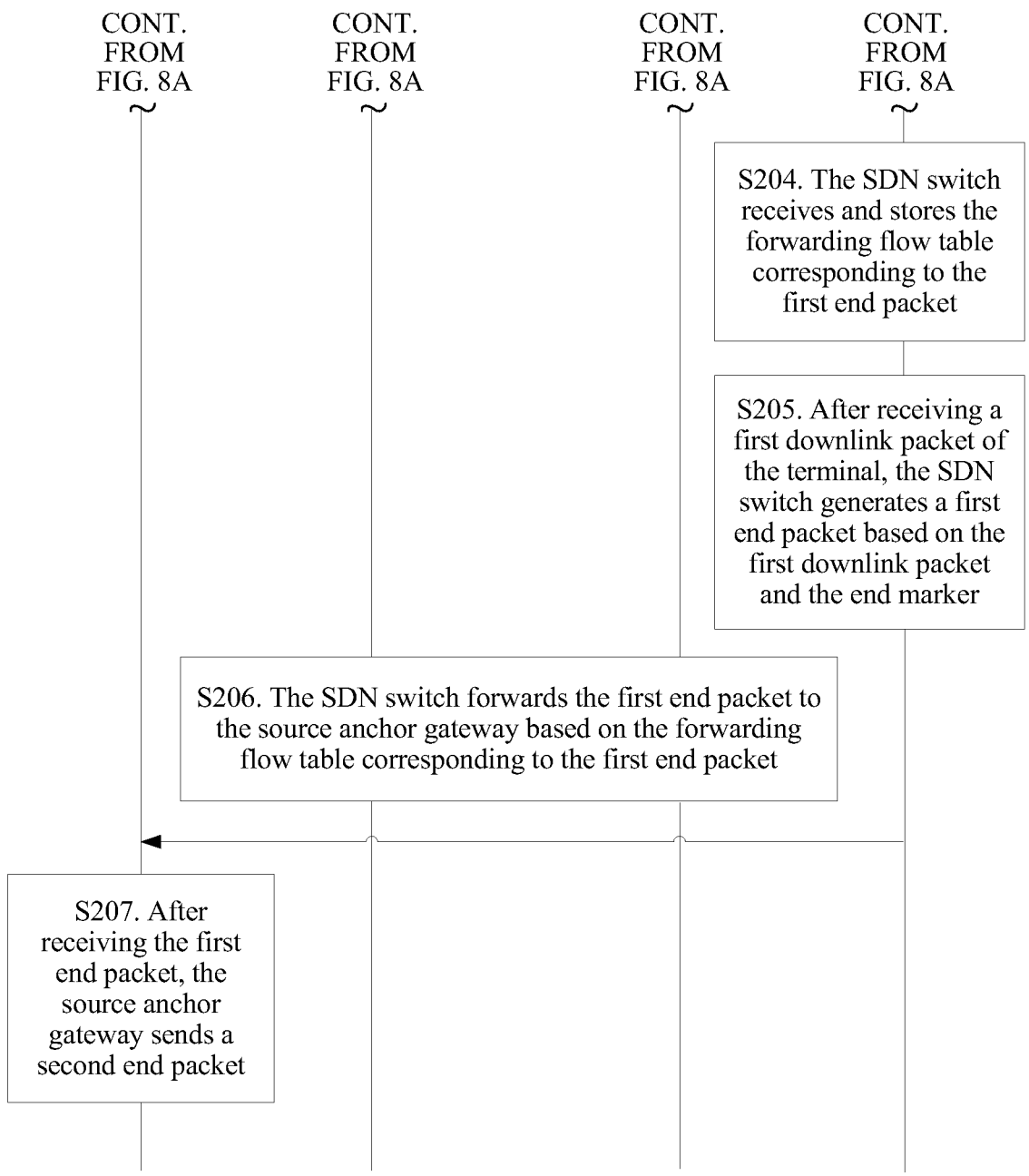

In this embodiment of the present disclosure, the source anchor gateway is switched in the base station switching process, and consequently, the source anchor gateway cannot detect whether packet transmission ends on the original path, so that the source anchor gateway cannot send the end packet to the original path. Therefore, this embodiment of the present disclosure further provides a method for triggering the source anchor gateway to send the end packet. As shown in FIG. 8A and FIG. 8B, the method may include the following operations.

S201. A CP device sends a modification request message to an SDN controller, where the modification request message includes an end marker and an identifier of a source anchor gateway.

It may be understood that in the anchor gateway switching method provided in this embodiment of the present disclosure, the CP device sends a correspondence between a terminal and a target anchor gateway to the SDN controller by using the modification request message, to notify the SDN controller to update a forwarding flow table corresponding to a downlink packet of the terminal, and to notify the SDN controller to send the modification request message carrying the end marker and the identifier of the source anchor gateway to the SDN controller.

S202. The SDN controller determines, based on the end marker and the identifier of the source anchor gateway, a forwarding flow table corresponding to a first end packet.

The forwarding flow table corresponding to the first end packet is used to notify an SDN switch to forward the first end packet to the source anchor gateway. The forwarding flow table corresponding to the first end packet includes the end marker.

S203. The SDN controller sends the forwarding flow table corresponding to the first end packet to an SDN switch.

It may be understood that if a plurality of SDN switches are configured to forward the downlink packet of the terminal, the SDN controller may send the forwarding flow table corresponding to the first end packet to the plurality of SDN switches.

S204. The SDN switch receives and stores the forwarding flow table corresponding to the first end packet.

S205. After receiving a first downlink packet of the terminal, the SDN switch generates the first end packet based on the first downlink packet and the end marker.

The first downlink packet is a downlink packet from a service server to the terminal for the first time after the source anchor gateway is switched to the target anchor gateway. After the SDN switch receives the first downlink packet from the service server, when the downlink packet is forwarded based on an updated forwarding flow table corresponding to the downlink packet of the terminal, the downlink packet needs to be replicated, and the end marker is set in a replicated downlink packet to generate the first end packet. Alternatively, the SDN switch replicates a packet header of the downlink packet, and sets the end marker in a replicated packet header to generate the first end packet.

It should be noted that when there are a plurality of SDN switches, only the SDN switch that directly receives the first downlink packet from the service server needs to determine the first end packet based on the first downlink packet and the end marker, and when receiving the first downlink packet and the first end packet, other SDN switches may perform forwarding based on a corresponding forwarding flow table.

S206. The SDN switch forwards the first end packet to the source anchor gateway based on the forwarding flow table corresponding to the first end packet.

S207. After receiving the first end packet, the source anchor gateway sends a second end packet.

In this embodiment of the present disclosure, the first end packet is used to trigger the source anchor gateway to send the second end packet. After receiving the first end packet, the source anchor gateway may send the second end packet and discard the first end packet. The second end packet is a GTPU null packet carrying the end marker.

Figure 9:
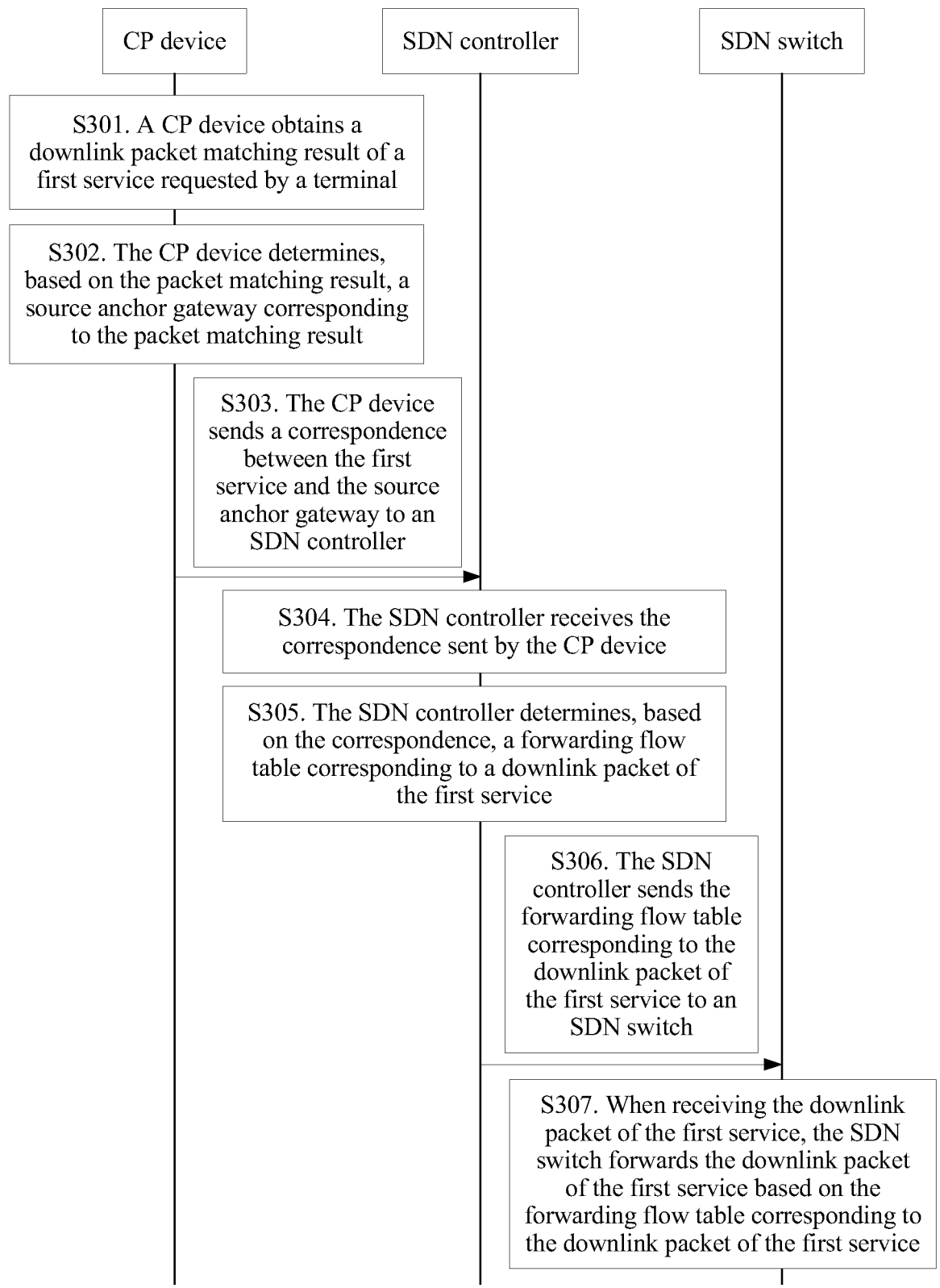
FIG. 9 is a schematic communications diagram of an SDN domain registration method according to an embodiment of the present disclosure.

Further, an embodiment of the present disclosure further provides an SDN domain registration method, and the anchor gateway switching method provided in the foregoing embodiments of the present disclosure may be implemented according to the registration method. As shown in FIG. 9, the SDN domain registration method includes the following operations.

S301. A CP device obtains a packet matching result of a first service requested by a terminal.

The packet matching result may be a first service matching rule identifier or an application identifier.

The CP device may obtain the packet matching result by using a received event reporting message, and the event reporting message is sent, after the terminal establishes a PDN, by an anchor gateway accessed by the terminal. The anchor gateway obtains the service matching rule from the CP device in advance, determines the packet matching result corresponding to the first service requested by the terminal, and sends the event reporting message carrying the packet matching result to the CP device. The event reporting message may further carry an identifier of the terminal, feature information of a downlink packet of the first service, and the like.

S302. The CP device determines, based on the packet matching result, a source anchor gateway corresponding to the packet matching result.

It should be noted that the CP device pre-stores a correspondence between a packet matching result and an anchor gateway, for example, a correspondence between a rule identifier and an anchor gateway or a correspondence between an application identifier and an anchor gateway. The CP device may find, based on the packet matching result of the first service, an anchor gateway corresponding to the packet matching result, to determine a source anchor gateway of the first service.

S303. The CP device sends a correspondence between the first service and the source anchor gateway to an SDN controller.

The CP device may use the packet feature information of the first service and an identifier of the source anchor gateway to indicate the correspondence between the first service and the source anchor gateway. The packet feature information of the first service may be 5-tuple information of the packet of the first service, or the identifier of the terminal and an identifier of a service server providing the first service.

The CP device may send a notification message or a request message carrying the correspondence between the first service and the source anchor gateway to the SDN controller, so that the SDN controller determines, based on the correspondence between the first service and the source anchor gateway, a forwarding flow table corresponding to the downlink packet of the first service.

S304. The SDN controller receives the correspondence from the CP device.

S305. The SDN controller determines, based on the correspondence, a forwarding flow table corresponding to a downlink packet of the first service.

S306. The SDN controller sends the forwarding flow table corresponding to the downlink packet of the first service to an SDN switch.

S307. When receiving the downlink packet of the first service, the SDN switch forwards the downlink packet of the first service based on the forwarding flow table corresponding to the downlink packet of the first service.

It may be understood that in the SDN domain registration method provided in this embodiment of the present disclosure, the packet of the first service of the terminal can be forwarded in the SDN domain. Therefore, when the source anchor gateway of the first service needs to be switched, the method described in S101 to S111 can be used to switch the source anchor gateway for the first service.

The foregoing mainly describes the solutions provided in the embodiments of the present disclosure from a perspective of interaction between network elements. It may be understood that, to implement the foregoing functions, each network element, such as the SDN controller, the CP device, and the SDN switch, includes a corresponding hardware structure and/or software module that is used to perform each function. A person of ordinary skill in the art should easily be aware that, in combination with the examples described in the embodiments disclosed in this specification, units, algorithms operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 10:
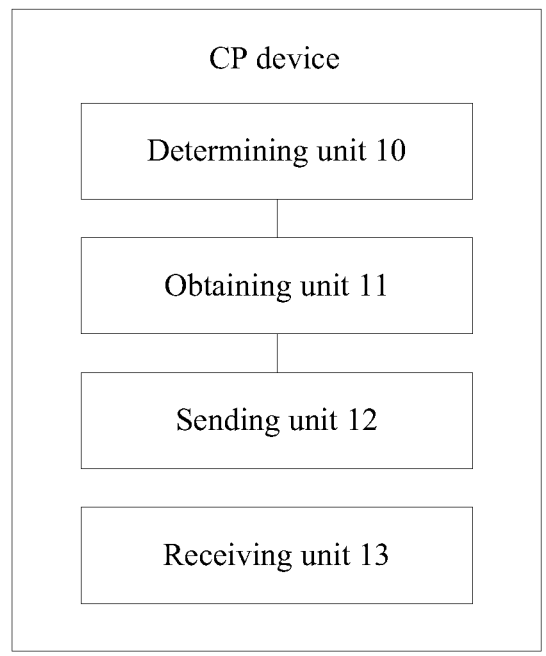
FIG. 10 is a schematic structural diagram of a CP device according to an embodiment of the present disclosure.

In the embodiments of the present disclosure, function module division may be performed on the SDN controller, the CP device, the SDN switch, and the like based on the foregoing method embodiments. For example, each function module may be obtained through division based on each function, or two or more functions may be integrated in one processing module. The integrated module may be implemented in a form of hardware, or may be implemented in a form of a software functional module. It should be noted that in the embodiments of the present disclosure, module division is an example, and is merely logical function division and may be other division in actual implementation In a case of obtaining function modules through division based on functions, FIG. 10 is a possible schematic structural diagram of the CP device in the foregoing embodiments. The CP device includes a determining unit 10, an obtaining unit 11, a sending unit 12, and a receiving unit 13. The determining unit 10 is configured to support the CP device in performing processes S101 and S103 in FIG. 3A and FIG. 3B, processes S101a, S101b, and S103 in FIG. 4A and FIG. 4B, processes S101c, S101d, and S103 in FIG. 5A to FIG. 5C, processes S101e, S101f, and S103 in FIG. 6A to FIG. 6C, processes S101g, S101h, and S103 in FIG. 7A to FIG. 7C, and a process S302 in FIG. 9. The obtaining unit 11 is configured to support the CP device in performing a process S102 in FIG. 3A to FIG. 7C and a process S301 in FIG. 9. The sending unit 12 is configured to support the CP device in performing a process S104 in FIG. 3A to FIG. 7C, a process S201 in FIG. 8A and FIG. 8B, and a process S303 in FIG. 9. The receiving unit 13 is configured to support the CP device in performing a process S111 in FIG. 3A to FIG. 7C and a process S207 in FIG. 8A and FIG. 8B. All related content of operations in the foregoing method embodiments may be cited in function description of corresponding function modules, and details are not described herein again.

Figure 11:
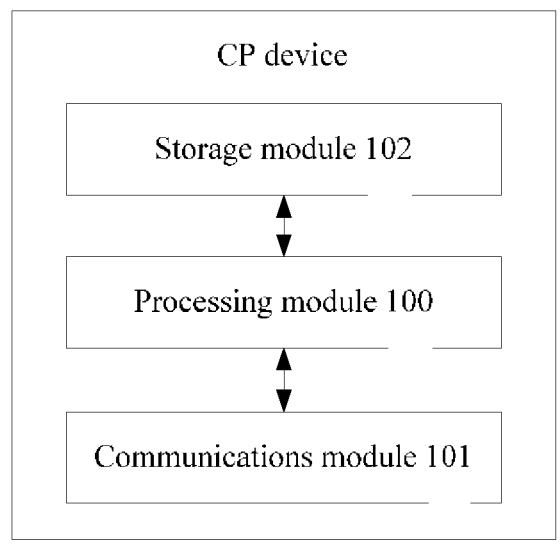
FIG. 11 is a schematic structural diagram of another CP device according to an embodiment of the present disclosure.

When an integrated unit is used, FIG. 11 is a possible schematic structural diagram of the CP device in the foregoing embodiments. The CP device includes a processing module 100 and a communications module 101. The processing module 100 is configured to perform control management on actions of the CP device. For example, the processing module 100 is configured to support the CP device in performing processes S101, S102, S103, S104, and S111 in FIG. 3A and FIG. 3B, processes S101a, S101b, S102, S103, S104, and S111 in FIG. 4A and FIG. 4B, process S101c, S101d, S102, S103, S104 and S111 in FIG. 5A to FIG. 5C, processes S101e, S101f, S102, S103, S104, and S111 in FIG. 6A to FIG. 6C, processes S101g, S101h, S102, S103, S104, and S111 in FIG. 7A to FIG. 7C, a process S201 in FIG. 8A and FIG. 8B, processes S301, S302, and S303 in FIG. 9, and/or other processes of the technologies described in this specification. The communications module 101 is configured to support the CP device in communicating with other network entities, for example, communicating with the function module or the network entity shown in FIG. 2 to FIG. 9. The CP device may further include a storage module 102, configured to store program code and data of the CP device.

The processing module 100 may be a processor or a controller, for example, a CPU, a general purpose processor, a digital signal processor (DSP), an application-specific integrated circuit (ASIC), a field programmable gate array (FPGA), or another programmable logic device, a transistor logic device, a hardware component, or any combination thereof The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 101 may be a communications interface. The storage module 102 may be a memory.

Figure 12:
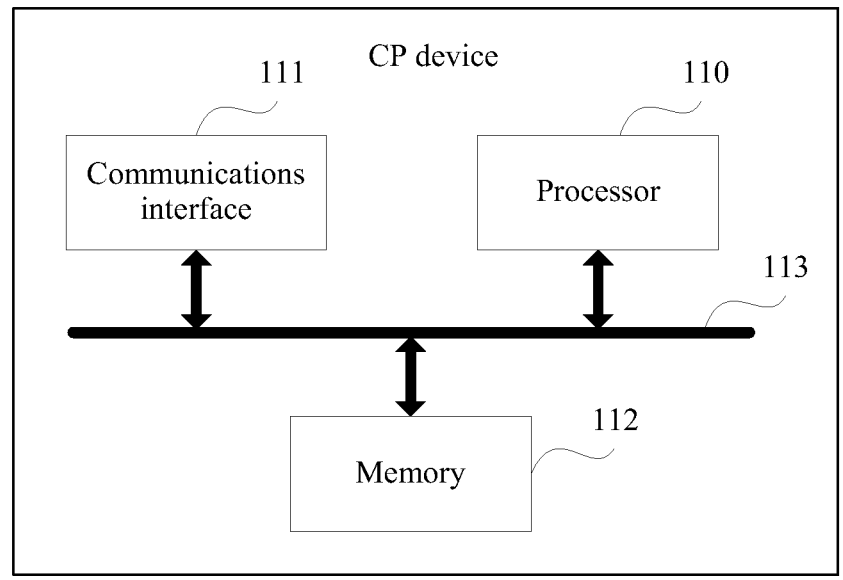
FIG. 12 is a schematic structural diagram of still another CP device according to an embodiment of the present disclosure.

When the processing module 100 is a processor, the communications module 101 is a communications interface, and the storage module 102 is a memory, the CP device in this embodiment of the present disclosure may be the CP device shown in FIG. 12.

Refer to FIG. 12, the CP device includes a processor 110, a communications interface 111, a memory 112, and a bus 113. The communications interface 111, the processor 110, and the memory 112 are connected to each other by using the bus 113. The bus 113 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

Figure 13:
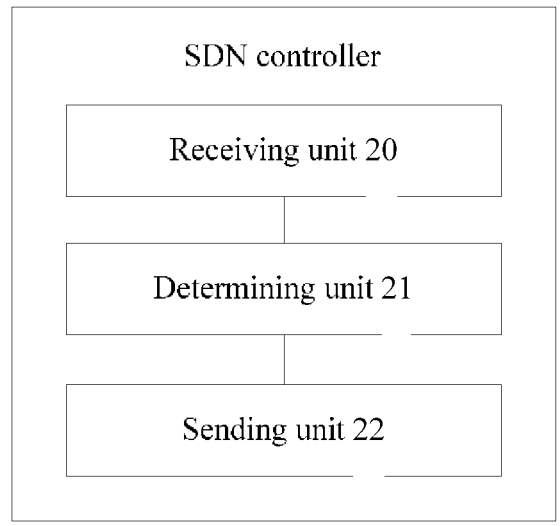
FIG. 13 is a schematic structural diagram of an SDN controller according to an embodiment of the present disclosure.

In a case of obtaining function modules through division based on functions, FIG. 13 is a possible schematic structural diagram of the SDN controller in the foregoing embodiments. The SDN controller includes a receiving unit 20, a determining unit 21, and a sending unit 22. The receiving unit 20 is configured to support the SDN controller in performing a process S105 in FIG. 3A to FIG. 7C, a process S202 in FIG. 8A and FIG. 8B, and a process S304 in FIG. 9. The determining unit 21 is configured to support the SDN controller in performing a process S106 in FIG. 3A to FIG. 7C and a process S305 in FIG. 9. The sending unit 22 is configured to support the SDN controller in performing processes S107 and S110 in FIG. 3A to FIG. 7C, a process S203 in FIG. 8A and FIG. 8B, and a process S306 in FIG. 9. All related content of operations in the foregoing method embodiments may be cited in function description of corresponding function modules, and details are not described herein again.

Figure 14:
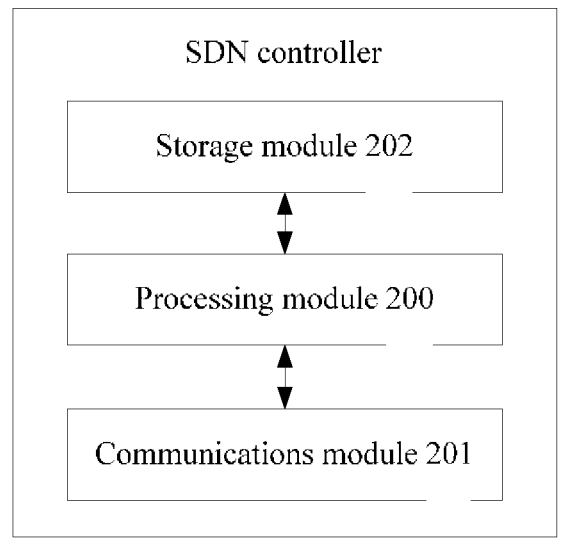
FIG. 14 is a schematic structural diagram of another SDN controller according to an embodiment of the present disclosure.

When an integrated unit is used, FIG. 14 is a possible schematic structural diagram of the SDN controller in the foregoing embodiments. The SDN controller includes a processing module 200 and a communications module 201. The processing module 200 is configured to perform control management on actions of the SDN controller. For example, the processing module 200 is configured to support the SDN controller in performing processes S105, S106, S107, and S110 in FIG. 3A to FIG. 7C, processes S202 and S203 in FIG. 8A and FIG. 8B, processes S304, S305, and S306 in FIG. 9, and/or other processes of the technologies described in this specification. The communications module 201 is configured to support the SDN controller in communicating with other network entities, for example, communicating with the function module or the network entity shown in FIG. 2 to FIG. 9. The SDN controller may further include a storage module 202, configured to store program code and data of the SDN controller.

The processing module 100 may be a processor or a controller, for example, a CPU, a DSP, an ASIC, an FPGA or another programmable logic device, a transistor logic device, a hardware component, or any combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 201 may be a transceiver, a transceiver circuit, a communications interface, or the like. The storage module 202 may be a memory.

Figure 15:
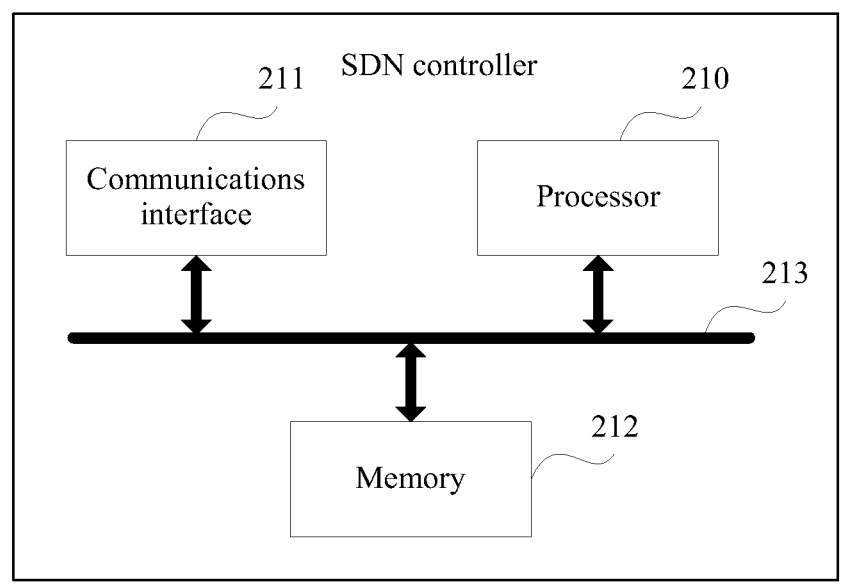
FIG. 15 is a schematic structural diagram of still another SDN controller according to an embodiment of the present disclosure.

When the processing module 200 is a processor, the communications module 201 is a communications interface, and the storage module 202 is a memory, the SDN controller in this embodiment of the present disclosure may be the SDN controller shown in FIG. 15.

Refer to FIG. 12, the SDN controller includes a processor 210, a communications interface 211, a memory 212, and a bus 213. The communications interface 211, the processor 210, and the memory 212 are connected to each other by using the bus 213, and the bus 213 may be a PCI bus, an EISA bus, or the like. The bus may be classified into an address bus, a data bus, a control bus, and the like. For ease of representation, only one thick line is used to represent the bus in FIG. 12, but this does not mean that there is only one bus or only one type of bus.

Figure 16:
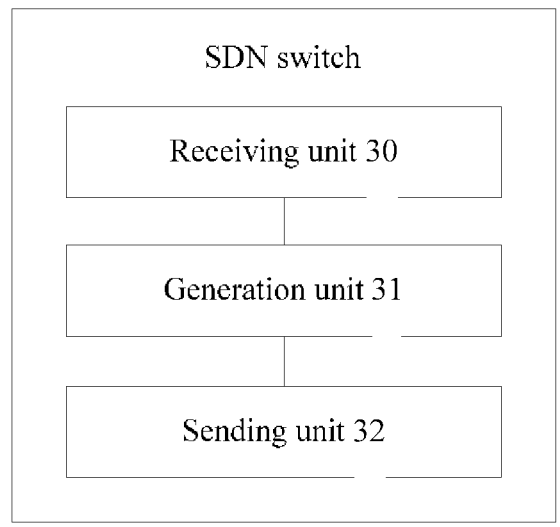
FIG. 16 is a schematic structural diagram of an SDN switch according to an embodiment of the present disclosure.

In a case of obtaining function modules through division based on functions, FIG. 16 is a possible schematic structural diagram of the SDN switch in the foregoing embodiments. The SDN switch includes a receiving unit 30, a generation unit 31, and a sending unit 32. The receiving unit 30 is configured to support the SDN switch in performing a process S108 in FIG. 3A to FIG. 7C, a process S204 in FIG. 8A and FIG. 8B, and a process S307 in FIG. 9. The generation unit 31 is configured to support the SDN switch in performing a process S205 in FIG. 8A and FIG. 8B. The sending unit 32 is configured to support the SDN switch in performing a process S109 in FIG. 3A to FIG. 7C and a process S206 in FIG. 8A and FIG. 8B. All related content of operations in the foregoing method embodiments may be cited in function description of corresponding function modules, and details are not described herein again.

Figure 17:
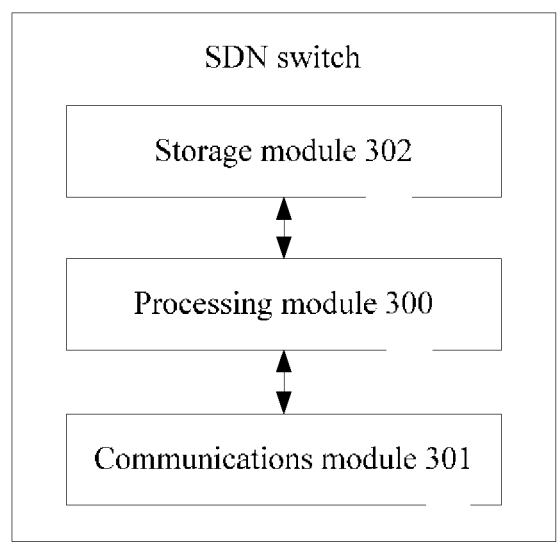
FIG. 17 is a schematic structural diagram of another SDN switch according to an embodiment of the present disclosure.

When an integrated unit is used, FIG. 17 is a possible schematic structural diagram of the SDN switch in the foregoing embodiments. The SDN switch includes a processing module 300 and a communications module 301. The processing module 300 is configured to perform control management on actions of the SDN switch. For example, the processing module 300 is configured to support the SDN switch in performing processes S108 and S109 in FIG. 3A to FIG. 7C, processes S204, S205, and S206 in FIG. 8A and FIG. 8B, a process S307 in FIG. 9, and/or other processes of the technologies described in this specification. The communications module 301 is configured to support the SDN switch in communicating with other network entities, for example, communicating with the function module or the network entity shown in FIG. 2 to FIG. 9. The SDN switch may further include a storage module 302, configured to store program code and data of the SDN switch.

The processing module 300 may be a processor or a controller, for example, a CPU, a general purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 301 may be a communications interface. The storage module 302 may be a memory.

Figure 18:
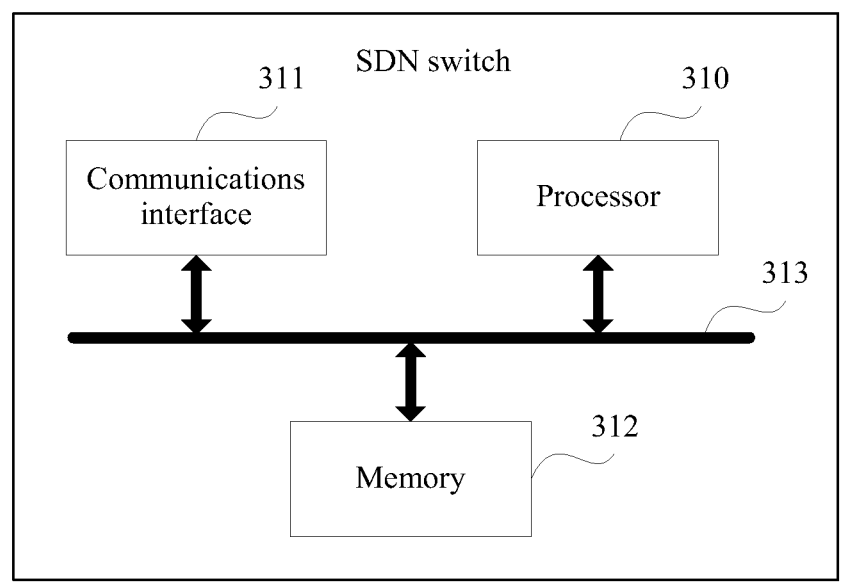
FIG. 18 is a schematic structural diagram of still another SDN switch according to an embodiment of the present disclosure.

When the processing module 300 is a processor, the communications module 301 is a communications interface, and the storage module 302 is a memory, the SDN switch in this embodiment of the present disclosure may be the SDN switch shown in FIG. 18.

Refer to FIG. 18, the SDN switch includes a processor 310, a communications interface 311, a memory 312, and a bus 313. The communications interface 311, the processor 310, and the memory 312 are connected to each other by using the bus 313, and the bus 313 may be a PCI bus, an EISA bus, or the like. The bus may be classified into an address bus, a data bus, a control bus, and the like. For ease of representation, only one thick line is used to represent the bus in FIG. 18, but this does not mean that there is only one bus or only one type of bus.

Method or algorithm operations described in combination with the content disclosed in the present disclosure may be implemented by hardware, or may be implemented by a processor executing a software notification. The software notification may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

For example, as shown in FIG. 2, an embodiment of the present disclosure provides an anchor gateway switching system, including the CP device shown in any one of FIG. 10 to FIG. 12, the SDN controller shown in any one of FIG. 13 to FIG. 15, the SDN switch shown in any one of FIG. 16 to FIG. 18, a source anchor gateway, and a target anchor gateway.

In the anchor gateway switching system provided in this embodiment of the present disclosure, the CP device may determine the target anchor gateway based on current location information of a terminal, and send an identifier of the terminal and an identifier of the target anchor gateway to the SDN controller, so that the SDN controller updates, based on the identifier of the terminal and the identifier of the target anchor gateway, a forwarding flow table corresponding to a downlink packet of the terminal. The SDN controller sends an updated forwarding flow table to the SDN switch, so that after receiving the downlink packet of the terminal, the SDN switch can directly send the downlink packet to the target anchor gateway based on the updated forwarding flow table, and the target anchor gateway forwards the downlink packet for the terminal. Therefore, the downlink packet of the terminal does not need to be forwarded by the source anchor gateway. This avoids transmitting the downlink packet in a roundabout forwarding path, and reduces a packet loss rate of the downlink packet in a transmission process.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more notifications or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. An anchor gateway switching method, comprising:
   determining, by a control plane (CP) device, to switch a source anchor gateway, wherein the source anchor gateway forwards a downlink packet of a terminal before the switching;
   obtaining, by the CP device, location information of the terminal;
   determining, by the CP device, a target anchor gateway based on the location information; and
   sending, by the CP device, a modification request message to a software-defined networking (SDN) controller, wherein the modification request message comprises an identifier of the terminal and an identifier of the target anchor gateway, the modification request message is used to notify the SDN controller to: update, based on the identifier of the terminal and the identifier of the target anchor gateway, a forwarding flow table corresponding to the downlink packet, wherein the SDN controller sends the updated forwarding flow table to an SDN switch, such that in response to receiving the updated forwarding flow table, the SDN switch sends directly subsequent downlink packets of the terminal to the target anchor gateway based on the updated forwarding flow table.

2. The method according to claim 1, further comprising: obtaining, by the CP device, type information, wherein the type information comprises at least one of a type of the terminal or a type of a service of the terminal; and
   wherein determining the target anchor gateway comprises: determining, by the CP device, the target anchor gateway based on the location information and the type information.

3. The method according to claim 2, wherein the type information comprises the type of the service or comprises the type of the service and the type of the terminal, the modification request message further comprises information, about the service, determined by the CP device, and the modification request message is used to notify the SDN controller to update the forwarding flow table based on the identifier of the terminal, the identifier of the target anchor gateway, and the information about the service.

4. The method according to claim 1, wherein determining to switch the source anchor gateway comprises: receiving, by the CP device, a path switch request message from a target base station; and determining, by the CP device, to switch the source anchor gateway based on the path switch request message; and
   wherein the method further comprises: sending, by the CP device, a path switch answer message to the target base station, wherein the path switch answer message is used to notify the target base station to establish an uplink interface through which the target base station exchanges information with the target anchor gateway, and the uplink interface is used by the target base station to send a received uplink packet of the terminal to the target anchor gateway.

5. The method according to claim 1, wherein determining to switch the source anchor gateway comprises: receiving, by the CP device, a tracking area update (TAU) request message from a base station; and determining, by the CP device, to switch the source anchor gateway based on the TAU request message.

6. The method according to claim 1, wherein determining to switch the source anchor gateway comprises: receiving, by the CP device, a handover required message from a source base station; and determining, by the CP device, to switch the source anchor gateway based on the handover required message; and
   wherein the method further comprises: after receiving a handover notification message from a target base station, sending, by the CP device, a modify session request message to the target anchor gateway, wherein the modify session request message is used to notify the target anchor gateway to establish a downlink interface through which the target anchor gateway exchanges information with the target base station, and the downlink interface is used by the target anchor gateway to send the received downlink packet to the target base station.

7. The method according to claim 1, wherein determining to switch the source anchor gateway comprises: receiving, by the CP device, a service request message from a base station; and determining, by the CP device, to switch the source anchor gateway based on the service request message.

8. The method according to claim 7, further comprising:
   notifying, by the CP device, the source anchor gateway and the target anchor gateway to establish a downlink forwarding path, the downlink forwarding path is used to transmit the downlink packet temporarily stored on the source anchor gateway to the base station; and
   notifying, by the CP device, the source anchor gateway and the target anchor gateway to delete information corresponding to the downlink forwarding path.

9. The method according to claim 6, further comprising:
   sending, by the CP device, an uplink notification message to the SDN controller, wherein the uplink notification message comprises forwarding information of an uplink packet of the terminal and the identifier of the target anchor gateway, the uplink notification message is used to notify the SDN controller to determine, based on the forwarding information and the identifier of the target anchor gateway, a forwarding flow table corresponding to the uplink packet.

10. The method according to claim 1, further comprising:
    obtaining, by the CP device, a packet matching result of a first service of the terminal;
    determining, by the CP device based on the packet matching result, the source anchor gateway corresponding to the packet matching result; and sending, by the CP device, a correspondence between the first service and the source anchor gateway to the SDN controller; wherein
the modification request message is used to notify the SDN controller to update, based on the identifier of the terminal and the identifier of the target anchor gateway, the forwarding flow table corresponding to the downlink packet of the first service.

11. An anchor gateway switching method, comprising:
receiving, by a software-defined networking (SDN) controller, a modification request message from a control plane (CP) device, wherein the modification request message comprises an identifier of a terminal and an identifier of a target anchor gateway;
updating, by the SDN controller based on the identifier of the terminal and the identifier of the target anchor gateway, a forwarding flow table corresponding to a downlink packet of the terminal; and
sending, by the SDN controller, an updated forwarding flow table to an SDN switch such that in response to receiving the updated forwarding flow table, the SDN switch sends directly subsequent downlink packets of the terminal to the target anchor gateway based on the updated forwarding flow table.

12. The method according to claim 11, wherein the modification request message further comprises information about a service of the terminal; and
wherein updating the forwarding flow table comprises:
updating, by the SDN controller, the forwarding flow table based on the identifier of the terminal, the identifier of the target anchor gateway, and the information about the service.

13. The method according to claim 11, further comprising:
receiving, by the SDN controller, an uplink notification message from the CP device, wherein the uplink notification message comprises forwarding information of an uplink packet of the terminal and the identifier of the target anchor gateway;
determining, by the SDN controller based on the forwarding information and the identifier of the target anchor gateway, a forwarding flow table corresponding to the uplink packet; and
sending, by the SDN controller, the forwarding flow table corresponding to the uplink packet to the SDN switch.

14. The method according to claim 11, wherein the modification request message further comprises an end marker and an identifier of a source anchor gateway, and the method further comprises:
determining, by the SDN controller based on the end marker and the identifier of the source anchor gateway, a forwarding flow table corresponding to a first end packet, wherein the first end packet is used to trigger the source anchor gateway to send a second end packet; and
sending, by the SDN controller, the forwarding flow table corresponding to the first end packet to the SDN switch.

15. The method according to claim 11, further comprising: receiving, by the SDN controller, a correspondence between a first service of the terminal and the source anchor gateway from the CP device; determining, by the SDN controller based on the correspondence, a forwarding flow table corresponding to a downlink packet of the first service; and sending, by the SDN controller, the forwarding flow table corresponding to the downlink packet of the first service to the SDN switch; and
wherein updating the forwarding flow table corresponding to the downlink packet of the terminal comprises:
updating, by the SDN controller based on the identifier of the terminal and the identifier of the target anchor gateway, the forwarding flow table corresponding to the downlink packet of the first service.

16. An anchor gateway switching method, comprising:
receiving, by a software-defined networking (SDN) switch, a forwarding flow table corresponding to a first end packet from an SDN controller, wherein the first end packet is used to trigger a source anchor gateway to send a second end packet, and the forwarding flow table comprises an end marker;
generating, by the SDN switch after receiving a first downlink packet of a terminal, the first end packet based on the first downlink packet and the end marker, wherein the first downlink packet is a downlink packet from a service server to the terminal for the first time after the source anchor gateway is switched to a target anchor gateway; and
forwarding, by the SDN switch, the first end packet to the source anchor gateway based on the forwarding flow table, to trigger the source anchor gateway to send the second end packet, wherein the second end packet is a general packet radio service (GPRS) tunneling protocol user plane (GTPU) null packet carrying the end marker.

* * * * *